(12) United States Patent
Fukatsu et al.

(10) Patent No.: US 11,035,542 B2
(45) Date of Patent: Jun. 15, 2021

(54) VEHICLE FRONT LIGHTING APPARATUS

(71) Applicant: DENSO CORPORATION, Kariya (JP)

(72) Inventors: Yoichi Fukatsu, Kariya (JP); Toshiya Tanaka, Kariya (JP); Yosuke Ishiguro, Kariya (JP); Hisanori Takenaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/902,596

(22) Filed: Jun. 16, 2020

(65) Prior Publication Data

US 2020/0309340 A1    Oct. 1, 2020

Related U.S. Application Data

(63) Continuation of application No. PCT/JP2018/040930, filed on Nov. 5, 2018.

(30) Foreign Application Priority Data

Dec. 19, 2017  (JP) .............................. JP2017-242522

(51) Int. Cl.
*H05B 47/10* (2020.01)
*F21V 23/00* (2015.01)
(Continued)

(52) U.S. Cl.
CPC .......... *F21S 41/663* (2018.01); *B60Q 1/1423* (2013.01); *F21S 41/151* (2018.01);
(Continued)

(58) Field of Classification Search
CPC ........ H05B 47/10; H05B 47/14; H05B 47/16; H05B 47/24; H05B 45/10; H05B 45/30;
(Continued)

(56) References Cited

U.S. PATENT DOCUMENTS

2017/0008447 A1   1/2017  Fukui et al.
2018/0054862 A1*  2/2018  Takagimoto ............. B60Q 1/44

FOREIGN PATENT DOCUMENTS

JP    2008037240 A    2/2008
JP    2014170880 A    9/2014
(Continued)

OTHER PUBLICATIONS

U.S. Appl. No. 16/902,614, filed Jun. 16, 2020, Fukatsu et al.
U.S. Appl. No. 16/902,634, filed Jun. 16, 2020, Fukatsu et al.

*Primary Examiner* — Jimmy T Vu
(74) *Attorney, Agent, or Firm* — Harness, Dickey & Pierce, P.L.C.

(57) ABSTRACT

A vehicle front lighting apparatus includes a lighting device array in which a plurality of lighting devices are connected in series, a plurality of bypass circuits, a plurality of switch elements, a lighting controller, a current value detector, a voltage value controller, and a disconnection determiner. The voltage value controller applies a voltage to the lighting device array, and controls a voltage value to be applied to cause a value of current flowing through the lighting device array to reach a predetermined target current value. The disconnection determiner determines that there is a disconnection in any of the bypass circuits when the number of the switch elements brought into the opened state does not match the controlled voltage value.

4 Claims, 17 Drawing Sheets

(51) Int. Cl.
  *F21S 41/663* (2018.01)
  *F21S 41/151* (2018.01)
  *H05B 47/16* (2020.01)
  *B60Q 1/14* (2006.01)
  *F21V 23/04* (2006.01)
  *F21Y 115/10* (2016.01)

(52) U.S. Cl.
  CPC ........ *F21V 23/003* (2013.01); *F21V 23/0464* (2013.01); *H05B 47/16* (2020.01); *F21Y 2115/10* (2016.08)

(58) Field of Classification Search
  CPC ..... F21S 41/663; F21S 41/151; F21V 23/003; F21V 23/0464; F21Y 2115/10; B60Q 1/1423
  See application file for complete search history.

(56) References Cited

FOREIGN PATENT DOCUMENTS

| | | | |
|---|---|---|---|
| JP | 2016088223 | A | 5/2016 |
| JP | 2017021953 | A | 1/2017 |
| JP | 2017152169 | A | 8/2017 |

\* cited by examiner

VEHICLE FRONT LIGHTING APPARATUS

CROSS REFERENCE TO RELATED APPLICATIONS

The present application is a continuation application of International Patent Application No. PCT/JP2018/040930 filed on Nov. 5, 2018, which designated the U.S. and claims the benefit of priority from Japanese Patent Application No. 2017-242522 filed on Dec. 19, 2017. The entire disclosures of all of the above applications are incorporated herein by reference.

TECHNICAL FIELD

The present disclosure relates to a vehicle front lighting apparatus.

BACKGROUND

Conventionally, there has been known a vehicle front lighting apparatus that uses multiple lighting devices to illuminate a region in front of a vehicle in a shared manner.

SUMMARY

The present disclosure provides a vehicle front lighting apparatus that includes a lighting device array in which a plurality of lighting devices are connected in series, a plurality of bypass circuits, a plurality of switch elements, a lighting controller, a current value detector, a voltage value controller, and a disconnection determiner. The voltage value controller applies a voltage to the lighting device array, and controls a voltage value to be applied to cause a value of current flowing through the lighting device array to reach a predetermined target current value. The disconnection determiner determines that there is a disconnection in any of the bypass circuits when the number of the switch elements brought into the opened state does not match the controlled voltage value.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1A:
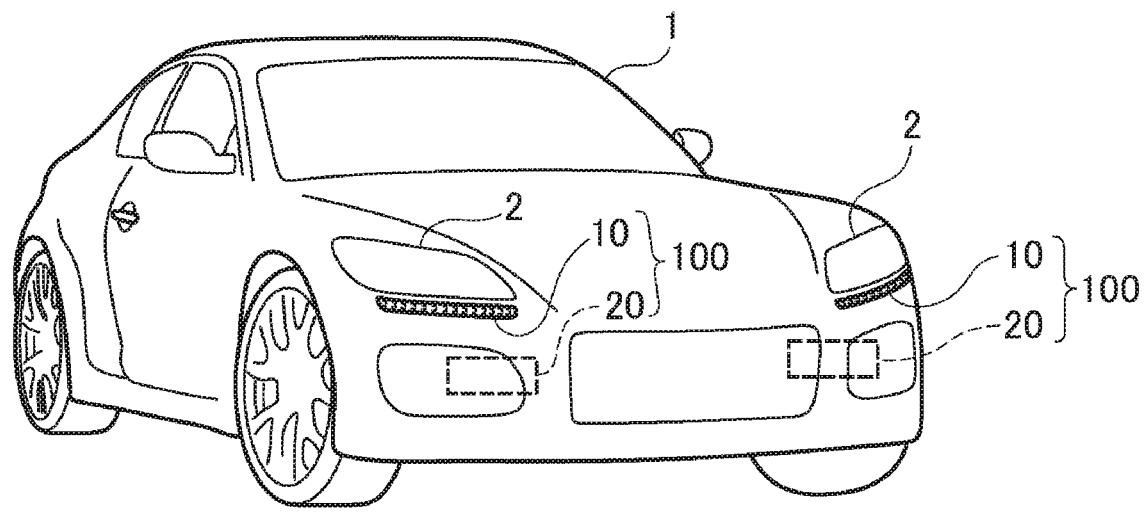
FIG. 1A is a diagram showing a vehicle on which a vehicle front lighting apparatus according to an embodiment of the present disclosure is mounted.

In a front lighting apparatus mounted on a subject vehicle, it is desired to be able to illuminate a light of high luminance to a long distance and in a wide range in order to enable a driver of the subject vehicle to grasp a situation at the long distance. On the other hand, in order to avoid illuminating a driver of an oncoming vehicle with high luminance to give a dazzle feeling (so-called glare), it is desired to be able to suppress the luminance of the light illuminating the region where the oncoming vehicle is present.

In a certain technique, a vehicle front lighting apparatus includes multiple lighting devices, and each lighting device is used to illuminate a region in front of a vehicle in a shared manner.

In the above technique, when an oncoming vehicle, a pedestrian, or the like are not present, a driver of a subject vehicle can easily grasp a distant situation by irradiating a light of high luminance to a distance and in a wide range. On the other hand, when the oncoming vehicle, the pedestrian, or the like is detected, a situation in which a driver of the oncoming vehicle, the pedestrian, or the like is given the dazzle feeling can be avoided by lowering the luminance of the lighting device in charge of the region where the oncoming vehicle, the pedestrian, or the like is present or turning off the lighting device.

Further, in the technique described above, the number of lighting devices mounted on the vehicle tends to gradually increase. The reason is that, as the number of mounted lighting devices increases, the region in which the lighting is shared by the individual lighting devices becomes smaller, and therefore, a situation can be prevented in which the lighting is darkened to a range in which the oncoming vehicle is not present when, for example, the oncoming vehicle is detected and the luminance of the lighting device is lowered or turned off. Alternatively, as the number of lighting devices increases, the region in front of the vehicle is subdivided into smaller regions, so that the distribution of the brightness illuminating the front can be brought closer to a more appropriate distribution.

However, as the number of lighting devices mounted on the vehicle increases, the number of wirings for driving the lighting devices also increases, thereby making it difficult to detect whether there is a disconnection in a wiring.

A vehicle front lighting apparatus according to an aspect of the present disclosure is for illuminating a region in front of a vehicle by use of a plurality of lighting devices in a shared manner, and includes a lighting device array in which the lighting devices are connected in series, a plurality of bypass circuits provided for the lighting devices, respectively and allowing a current flowing through the lighting devices to bypass the lighting devices, a plurality of switch elements provided for the bypass circuits, respectively, for opening and closing the bypass circuits, a lighting controller, a current value detector, a voltage value controller, and a disconnection determiner. The lighting controller is configured to control a lighting mode of the lighting device array by bringing the switch elements corresponding to the lighting devices to be turned on into an opened state and bringing the switch elements corresponding to the lighting devices to be turned off into a closed state. The current value detector is configured to detect a value of current flowing through the lighting device array. The voltage value controller is configured to apply a voltage to the lighting device array, and to control a voltage value to be applied to cause a value of current flowing through the lighting device array to reach a predetermined target current value. The disconnection determiner is configured to determine whether the number of the switch elements brought into the opened state matches the voltage value that is controlled, and if not, determines that a disconnection occurs in any of the bypass circuits. The lighting controller turns on and off the lighting devices in a predetermined cycle by opening and closing the switch elements in the predetermined cycle at phases mutually shifted among the switch elements. When receiving information about a target brightness to illuminate the region in front of the vehicle for each of the lighting devices, the lighting controller controls a time ratio of the opened state in the predetermined cycle of each of the switch elements corresponding to each of the lighting devices in accordance with the target brightness. The disconnection determiner determines whether there is the disconnection in the bypass circuits by determining whether the number of the switch elements in the opened state that varies in the predetermined cycle matches the voltage value controlled by the voltage value controller in the predetermined cycle.

In the vehicle front lighting apparatus described above, the presence or absence of the disconnection can be determined based on whether the number of lighting devices to be turned on matches the applied voltage value, and therefore, even in the case of illuminating the region in front of the vehicle using the multiple lighting devices, the presence or absence of the disconnection in the wiring for driving the lighting devices can be easily detected.

Embodiment

A vehicle front lighting apparatus 100 according to an embodiment of the present disclosure will be described with reference to the drawings. FIG. 1A shows a vehicle 1 on which a vehicle front lighting apparatus (FL) 100 is mounted. As shown in FIG. 1A, one front lighting apparatus 100 is mounted on each of the left and right sides of the vehicle 1, and each vehicle front lighting apparatus 100 includes an LED array 10 in which multiple light emitting diodes (hereinafter, referred to as LEDs) are disposed in a row, and a control module (CM) 20 for controlling lighting operation of individual LEDs forming the LED array 10. The LED arrays 10 are mounted one by one under headlights 2 mounted on the front left and right of the vehicle 1, and the control modules 20 are mounted inside the vehicle 1 inside the LED arrays 10.

Figure 1B:
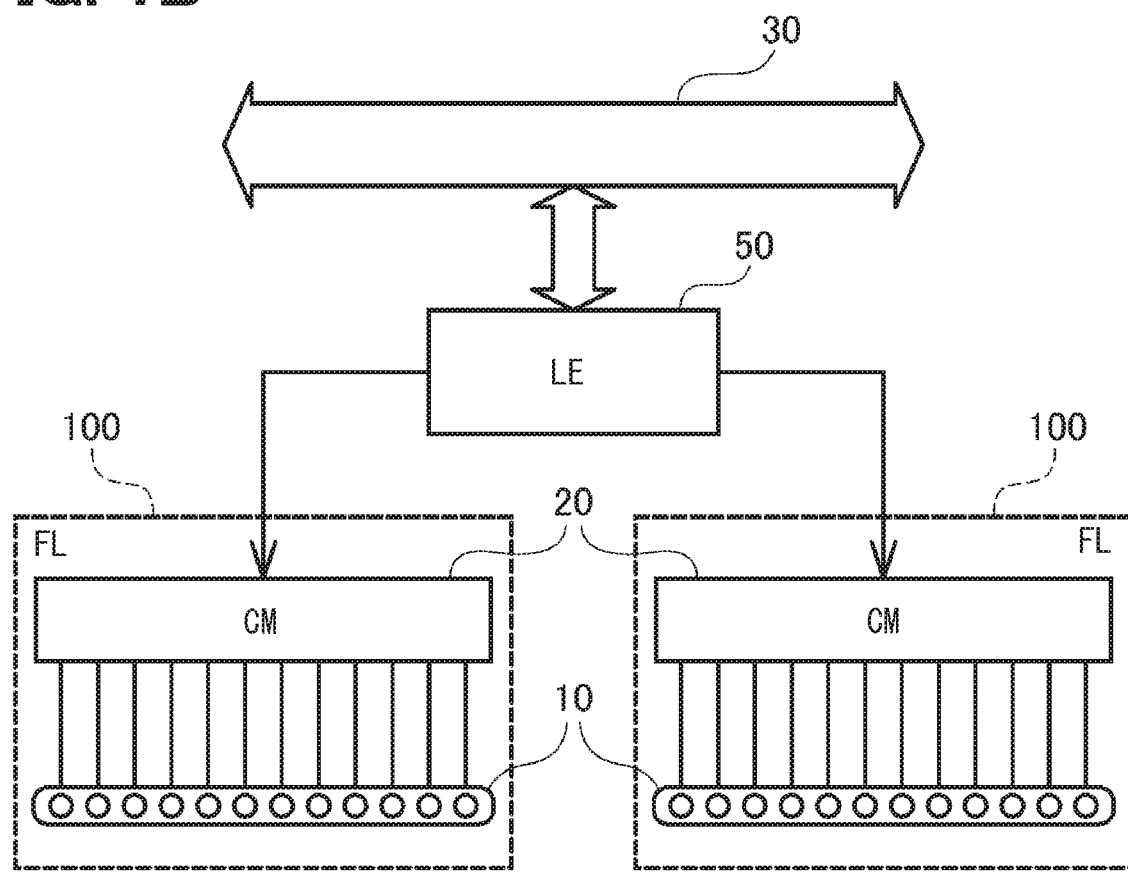
FIG. 1B is an illustrative diagram showing the vehicle front lighting apparatus mounted on the vehicle.

Further, as shown in FIG. 1B, the control modules 20 are each connected to a lamp ECU (LE) 50 mounted on the vehicle 1, and controls the operation of lighting the individual LEDs forming each LED array 10 in accordance with an instruction from the lamp ECU 50. The lamp ECU 50 is connected to an in-vehicle LAN 30 that connects multiple control ECUs (not shown) mounted on the vehicle 1, and determines an instruction content to be output to the lamp ECU 50 based on information received from other control ECUs through the in-vehicle LAN 30.

Figure 2:
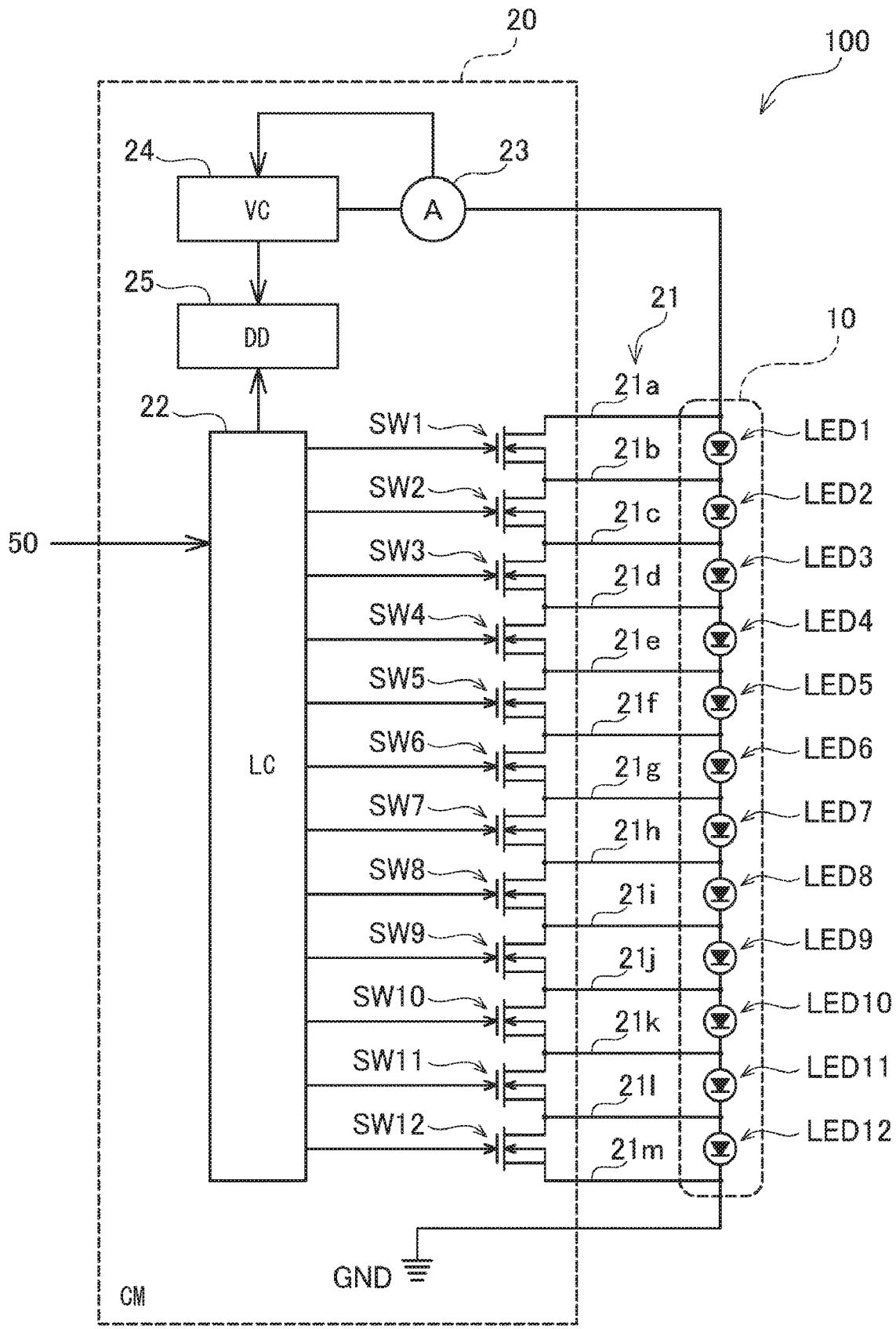
FIG. 2 is a block diagram showing an internal structure of the vehicle front lighting apparatus.

FIG. 2 shows a rough internal structure of the vehicle front lighting apparatus 100 according to the present embodiment. As shown in FIG. 2, the vehicle front lighting apparatus 100 according to the present embodiment includes the LED arrays 10 and the control modules 20. The LED arrays 10 are each structured such that LED 1 to LED 12 is connected in series to each other, and a cathode side of the LED 12 is grounded to a ground GND. In the present embodiment, the LED 1 to the LED 12 correspond to "lighting devices" in the present disclosure, and the LED array 10 corresponds to an "lighting device array" in the present disclosure.

The control modules 20 each include the same number of switch elements SW1 to SW12 as that of the LED 1 to the LED 12 in the LED arrays 10, and the switch elements SW1 to SW12 are connected in series with each other. A bypass wiring 21a drawn from an anode side (that is, a side not connected to the LED 2) of the LED 1 is connected to an upstream side (that is, a side not connected to the switch element SW2) of the switch element SW1. A bypass wiring 21b drawn from between the LED 1 and the LED 2 is connected between the switch element SW1 and the switch element SW2. Further, a bypass wiring 21c drawn from between the LED 2 and the LED 3 is connected between the switch element SW2 and the switch element SW3. Hereinafter, in the same manner, bypass wirings 21d to 21l led out from between the LED 3 to the LED 12 are connected between the switch element SW3 and the switch element SW12. A bypass wiring 21m drawn from a cathode side (that is, a side grounded to the ground GND) of the LED 12 is connected to a downstream side (that is, a side not connected to the switch element SW11) of the switch element SW12.

For that reason, when the switch element SW is brought into a conductive state, the bypass wiring 21a and the bypass wiring 21b become conductive through the switch element SW1, as a result of which a bypass circuit 21 that bypasses the LED 1 is formed. In addition, when the switch element SW2 is brought into a conductive state, the bypass wiring 21b and the bypass wiring 21c become conductive through the switch element SW2, as a result of which the bypass circuit 21 that bypasses the LED 2 is formed. Similarly, when the switch elements SW3 to SW12 are brought into a conductive state, the bypass circuits 21 for bypassing the LED 3 to the LED 12, respectively, are formed. A switch element called a power transistor is used as each of the switch elements SW1 to SW12. The power transistor has three terminals, and when a control terminal among those terminals is set to a high state, the other two terminals become conductive, and when the control terminal is set to a low state, the other two terminals become non-conductive.

In addition to the switch elements SW1 to SW12, the control module 20 also includes a lighting control unit (LC) 22, a current value detection unit 23, a voltage value control unit (VC) 24, and a disconnection determination unit (DD) 25. The lighting control unit 22 corresponds to a "lighting controller" in the present disclosure, the current value detection unit 23 corresponds to a "current value detector" in the present disclosure, the voltage value control unit 24 corresponds to a "voltage value controller" in the present disclosure, and the disconnection determination unit 25 corresponds to a "disconnection determiner" in the present disclosure.

Note that those "units" are abstract concepts in which the inside of the control module 20 is classified for convenience, focusing on the functions of the control module 20 of the vehicle front lighting apparatus 100 in order for the control module 20 to light the LED 1 to the LED 12 and detect the presence or absence of disconnection in the bypass wirings 21a to 21m. Therefore, it is not meant that the control module 20 of the vehicle front lighting apparatus 100 is physically divided into those "units". Those "units" can be realized as a computer program executed by a CPU, can be realized as an electronic circuit including an LSI and a memory, or can be realized by combining the computer program with the electronic circuit.

The lighting control unit 22 is connected to control terminals of the switch elements SW1 to SW12, and the control terminals of the respective switch elements SW1 to SW12 can be individually set to a high state or a low state.

The current value detection unit 23 is connected in series with the LED array 10, and can detect a value of current flowing through the LED array 10. Since the LED 1 to the LED 12 are connected in series with each other inside the LED array 10, the current value detected by the current value detection unit 23 is a value of current flowing through each of the LED 1 to the LED 12.

The voltage value control unit 24 applies a voltage to the LED array 10, receives a value of current flowing through the LED array 10 from the current value detection unit 23, and controls a voltage value to be applied to the LED array 10 so that the current value becomes a predetermined target current value.

The disconnection determination unit 25 receives the number of switch elements SW1 to SW12 whose control terminals are set to the low state from the lighting control unit 22, and receives the voltage value applied to the LED array 10 from the voltage value control unit 24. Then, the presence or absence of disconnection in the bypass wirings 21a to 21m is detected by determining whether the number of switch elements SW1 to SW12 matches the voltage value.

Hereinafter, a method for detecting the presence or absence of disconnection in the bypass wiring 21a to 21m by the vehicle front lighting apparatus 100 according to the present embodiment will be described, and as a preparation, the operation of lighting the LED 1 to the LED 12 by the vehicle front lighting apparatus 100 will be described.

Figure 3A:
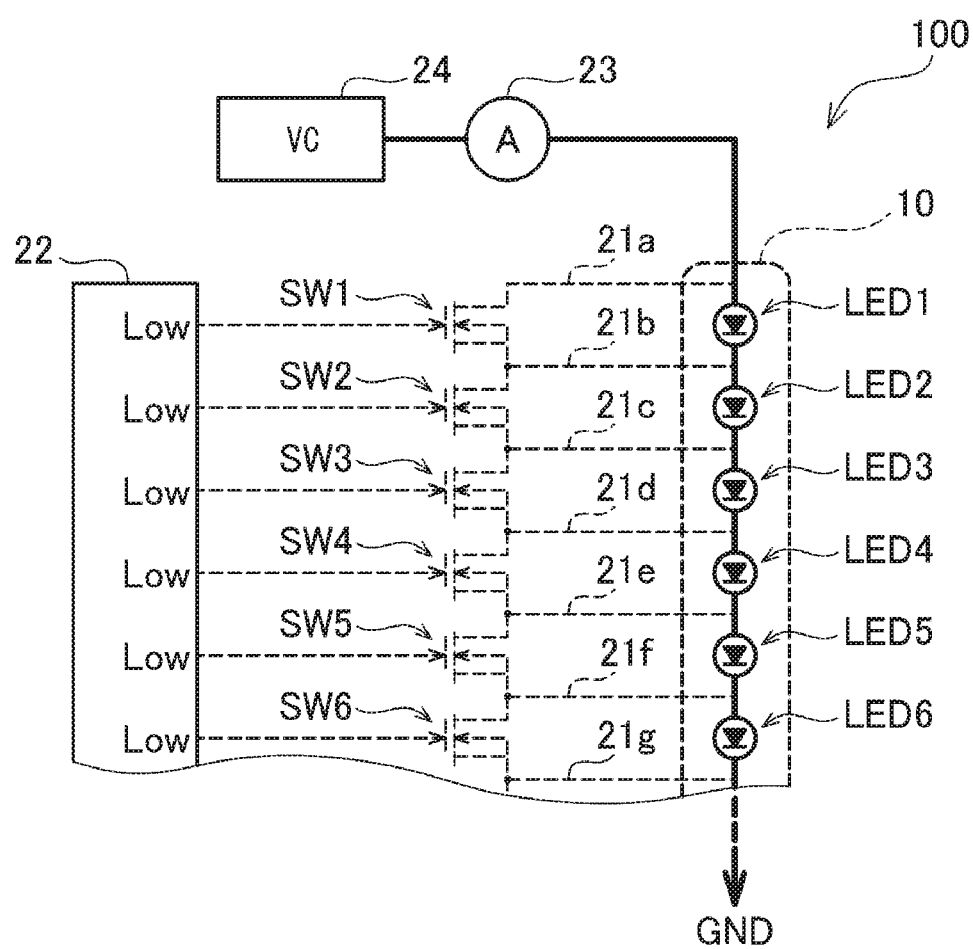
FIG. 3A is an illustrative diagram of an operation of the vehicle front lighting apparatus for lighting multiple LEDs of an LED array at a time.
Figure 3B:
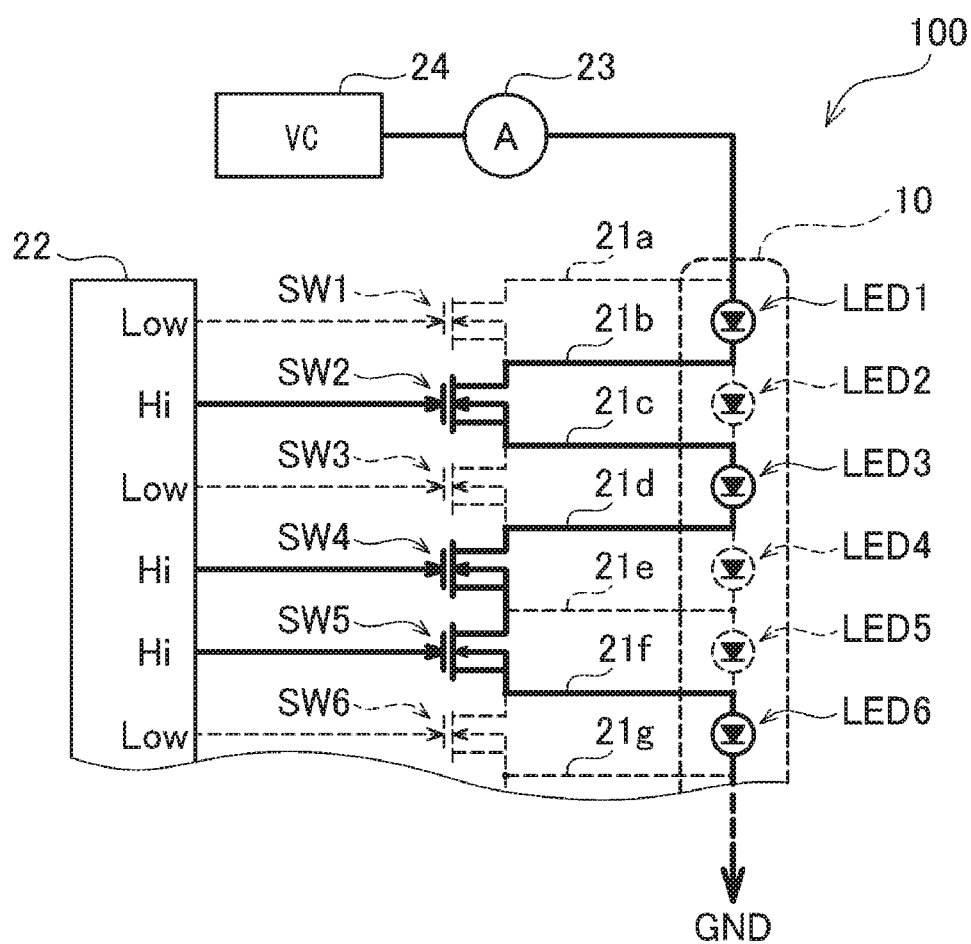
FIG. 3B is an illustrative diagram of an operation of the vehicle front lighting apparatus for individually lighting the multiple LEDs of the LED array.

FIGS. 3A and 3B show the operation of turning on or turning off the LED 1 to the LED 12 by the vehicle front lighting apparatus 100 according to the present embodiment. In the LED array 10, twelve LEDs of the LED 1 to LD 12 are connected in series to each other (see FIG. 2), however, in order to avoid complication of the illustration, the LED 7 to the LED 12 are omitted in FIGS. 3A and 3B. Therefore, in the descriptions in FIGS. 3A and 3B, it is assumed that the LED array 10 includes six LEDs of the LED 1 to the LED 6 connected in series, and the switch elements are also provided with the six switch elements SW1 to SW6.

As shown in FIG. 3A, when the respective control terminals of the switch elements SW1 to SW6 are set to a low state (Low), all of the switch elements SW1 to SW6 are set to a disconnected state. For that reason, when a voltage is applied from the voltage value control unit 24 to the LED array 10, a current flows through the LED 1 to LED 6 as indicated by a thick solid line in the drawing, and the LED 1 to the LED 6 are turned on.

Next, as shown in FIG. 3B, the control terminal of the switch element SW2 is set to a high state (Hi). Then, the switch element SW2 is in the conductive state, and the bypass circuit 21 that bypasses the LED 2 (that is, the bypass wiring 21b, the switch element SW2, and the bypass wiring 21c) is connected to the bypass circuit 21. Since a resistance value of the LEDs is generally larger than a resistance value of the bypass circuit 21, a current flowing through the LED 2 flows through the bypass circuit 21 through the switch element SW2, as a result of which the LED 2 is turned off.

When the control terminals of the switch element SW4 and the switch element SW5 are set to the high state, the switch element SW4 and the switch element SW5 are in the conductive state. As a result, the current flowing through the LED 4 and the LED 5 flows through the bypass circuit 21 (that is, the bypass wiring 21d, the switch element SW4, the switch element SW5, and the bypass wiring 21f) through the switch element SW4 and the switch element SW5, and the LED 4 and the LED 5 are turned off.

In FIG. 3B, a thick solid line represents a path through which a current flows when the control terminals of the switch element SW2, the switch element SW4, and the switch element SW5 are set to the high state. Therefore, in an example shown in FIG. 3B, the light is irradiated from the LED 1, LED 3, and LED 6.

As is clear from FIGS. 3A and 3B, when the lighting control unit 22 sets a control terminal of a certain switch element to the low state, the LED corresponding to the switch element SW is turned on, and conversely, when the control terminal is set to the high state, the LED corresponding to the switch element SW is turned off. Regardless of which LED is turned on, a current value of the current flowing through each LED is a current value detected by the current value detection unit 23.

In an example shown in FIG. 3A, a current flows through six LEDs, but in an example shown in FIG. 3B, a current flows through three LEDs and three switch elements. In this example, since the resistance value of the switch elements is sufficiently smaller than the resistance value of the LEDs, the resistance value of a path through which the current flows is halved by switching from the state of FIG. 3A to the state of FIG. 3B. Therefore, if the voltage value applied by the voltage value control unit 24 is not changed, the value of the current flowing through each LED is doubled. Conversely, in order to maintain the value of the current flowing through each LED, there is a need to halve the value of the voltage to be applied by the voltage value control unit 24.

Therefore, the voltage value control unit 24 detects the current value of the LED by the current value detection unit 23, and controls the voltage value to be applied so that the current value becomes a predetermined target current value.

In addition, since the current value of the LED is controlled to be a constant target current value in this manner, the luminance of the LED cannot be changed by changing the current value. Therefore, the luminance of the LED is changed by the following method.

Figure 4:
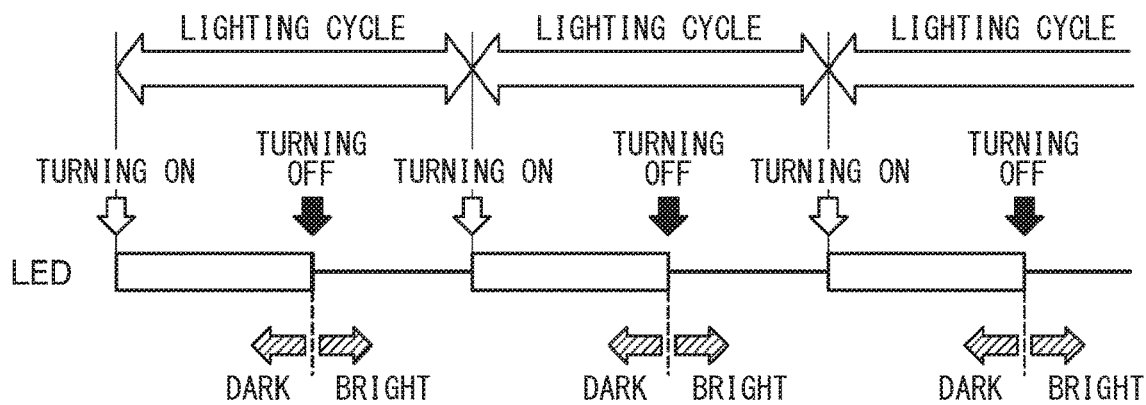
FIG. 4 is an illustrative diagram showing a method of changing the luminance of the LEDs by the vehicle front lighting apparatus.

FIG. 4 shows how the luminance of the lighting LED is changed. As shown in FIG. 4, the LED is repeatedly turned on and off within a predetermined lighting cycle. In this example, if the lighting cycle is set to a short period of time which is not recognizable by a human, the human can feel as if the luminance of the LED is reduced by reducing a ratio of a time of lighting within the lighting cycle. On the contrary, if the ratio of the lighting time is increased, the human can feel as if the luminance of the LED is increased.

Therefore, in the vehicle front lighting apparatus 100 according to the present embodiment, the luminance of the LED is changed by changing the timing at which the LED is turned off after the LED is periodically turned on in a predetermined lighting cycle. Incidentally, a state in which the lighting time is "0" in the lighting cycle is turned off, and the lighting state is a state of maximum luminance during the lighting cycle. In the vehicle front lighting apparatus 100 according to the present embodiment, the lighting cycle is set to a time of about 3 msec.

As described above with reference to FIG. 2, the 12 LEDS of the LED 1 to the LED 12 are provided in the LED array 10. In any of the LED 1 to the LED 12, as shown in FIG. 4, the luminance of the LED is adjusted by changing the turning-off timing after the LED is periodically turned on in a predetermined lighting cycle. However, the lighting cycles of the LED 1 to the LED 12 are set to be out of phase with each other, as a result of which the timings at which the LED 1 to the LED 12 are turned on are also different from each other.

Figure 5:
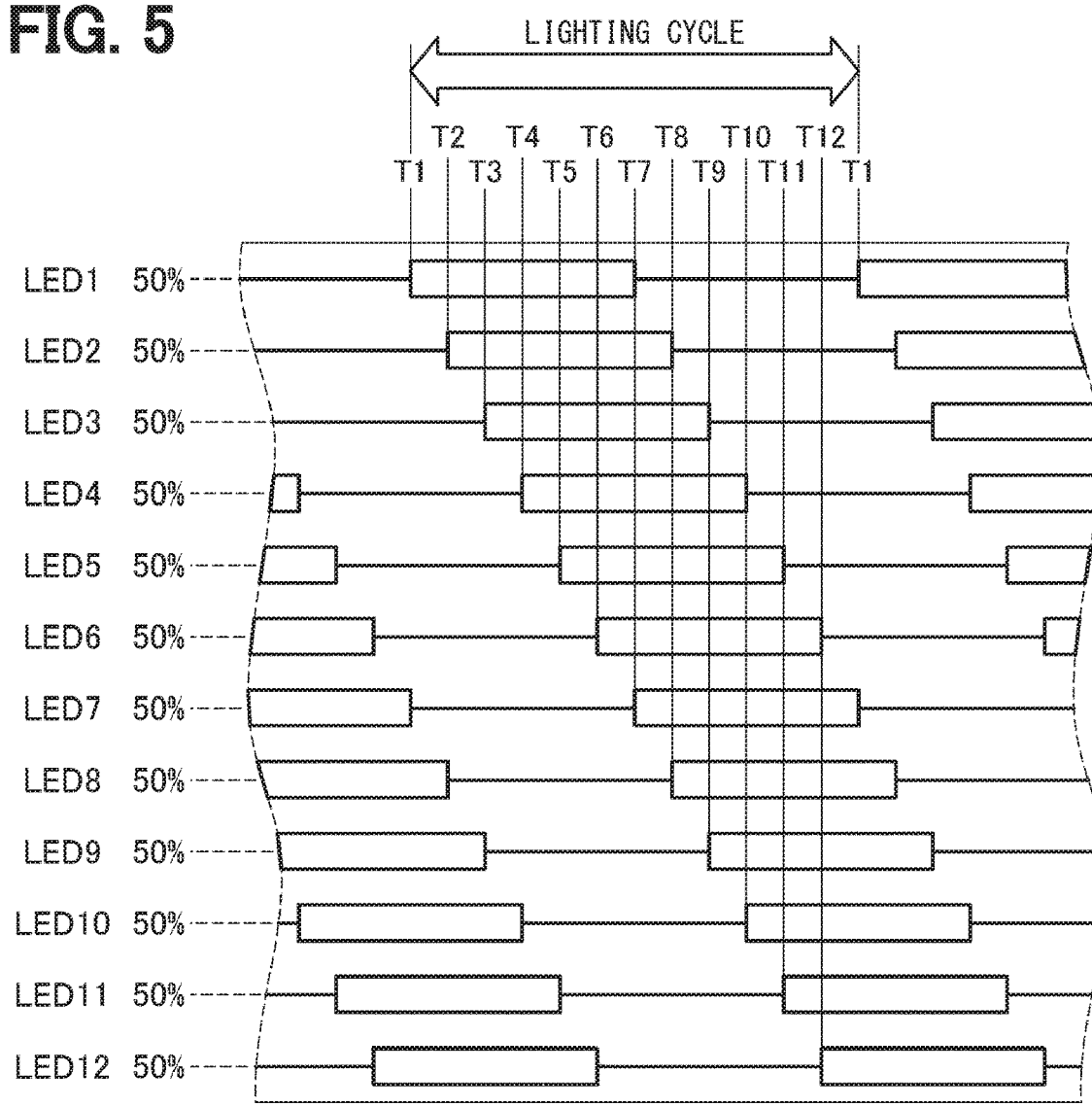
FIG. 5 is an illustrative diagram illustrating a state in which the vehicle front lighting apparatus illuminates a region in front of the vehicle by lighting the multiple LEDs of the LED array with the same luminance.

FIG. 5 illustrates a state in which the LED 1 to the LED 12 are turned on at different timings from each other. Incidentally, in an example shown in FIG. 5, a lighting duty ratio is set to 50% for each of the LED 1 to the LED 12. Here, the lighting duty ratio represents a ratio of a time during which the LED is turned on to the lighting cycle.

As shown in the figure, the LED 1 is turned on at a timing T1, the LED 2 is turned on at a timing T2, and the LED 3 is turned on at a timing T3. In the same manner, the LED 4 to the LED 12 are turned on sequentially at timings T4 to T12. The LED 1 to the LED 12 turned on in order in this manner are turned off in order at a time when a predetermined time has elapsed since the lighting (in this example, a half of the lighting cycle since the lighting duty ratio is set to 50%). Then, after the lapse of the lighting cycle after the LED 1 is turned on, the LED 1 is turned on again, and then the LED 2 to the LED 12 are turned on in order.

If the LED 1 to the LED 12 are turned on at a time, the resistance value of a path through which the voltage value control unit 24 causes a current to flow becomes the resistance value of 12 LEDs, and therefore, the voltage value control unit 24 needs to apply a large voltage (see FIG. 3A).

Further, when the LED 1 to the LED 12 are turned on at a time, the LED 1 to the LED 12 are turned off at the same time after a period of time corresponding to the lighting duty ratio has elapsed. For that reason, since the resistance value of the path through which the current flows rapidly decreases to the resistance value of the 12 switch elements, there is a need to rapidly decrease the voltage value applied by the voltage value control unit 24. Thereafter, when the LED 1 to the LED 12 are turned on, large voltages need to be applied. As described above, when the LED 1 to the LED 12 are turned on at a time, the voltage value control unit 24 necessaries to greatly vary the voltage value to be applied.

On the other hand, as illustrated in FIG. 5, when the phases of the lighting cycle of the LED 1 to the LED 12 are shifted from each other, the LED 1 to the LED 12 are turned on in order and then turned off in order, so that the variation of the voltage value applied by the voltage value control unit 24 can be reduced. In particular, in an example shown in FIG. 5, the lighting duty ratio of the LED 1 to the LED 12 is set to 50%, and thus the number of LEDs that are lighting is six at any time. For that reason, the voltage value control unit 24 does not need to change the voltage value.

However, the luminance at which the LED 1 to the LED 12 are turned on changes in accordance with information such as the surrounding state of the vehicle 1, the presence or absence of an oncoming vehicle, a pedestrian, or the like, and information such as the position at which the oncoming vehicle or pedestrian is detected. As described above with reference to FIG. 1B, when the lamp ECU 50 mounted on the vehicle 1 acquires those pieces of information through the in-vehicle LAN 30, the lamp ECU 50 determines the distribution of luminance at which the LED 1 to the LED 12 are turned on (so-called light distribution pattern), and outputs the distribution to the vehicle front lighting apparatus 100. Then, the control module 20 of the vehicle front lighting apparatus 100 determines the timings at which the LED 1 to the LED 12 are turned on and off in accordance with the light distribution pattern.

Figure 6A:
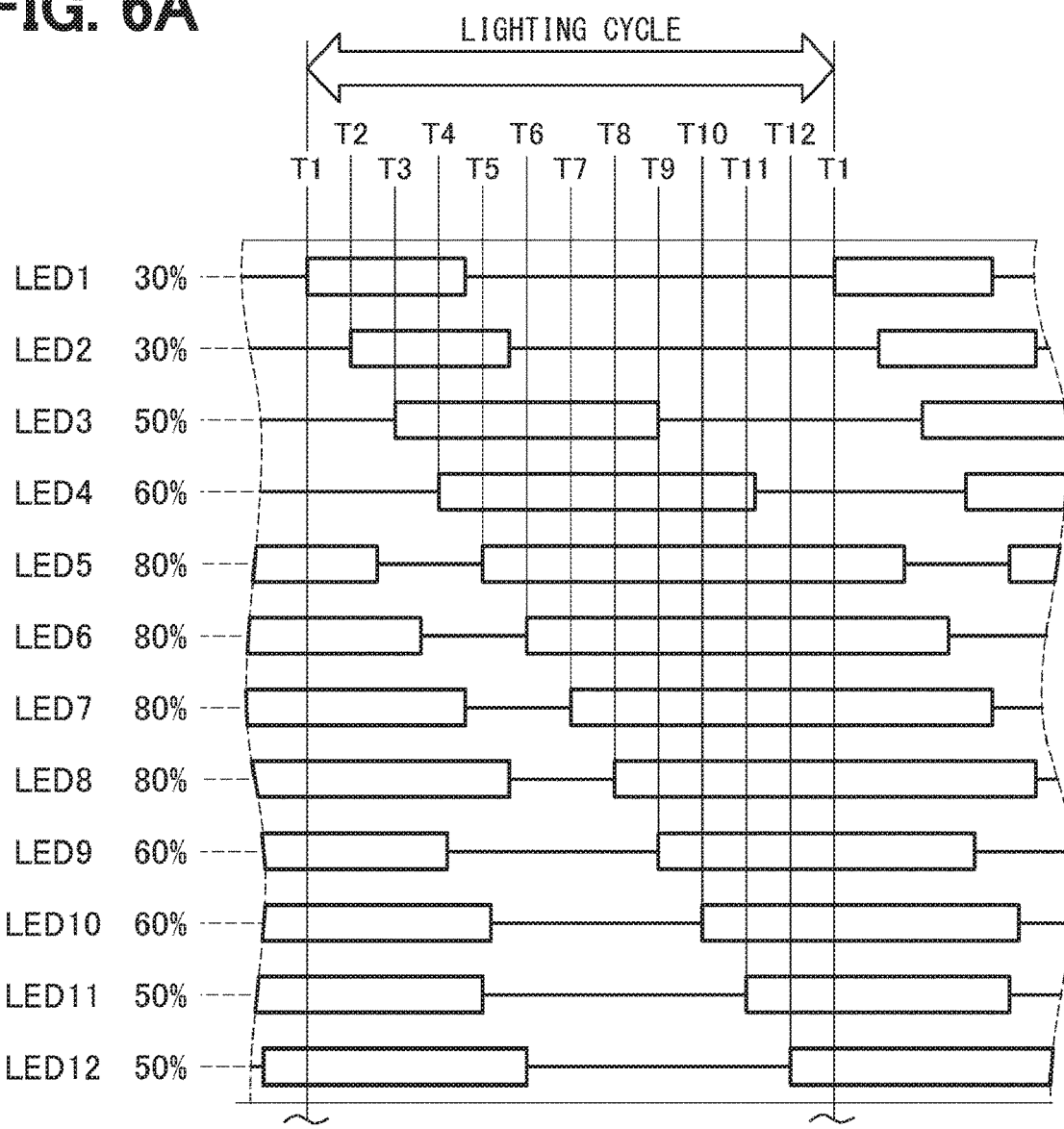
FIG. 6A is a diagram showing timings of turning on and off the multiple LEDs determined in accordance with a light distribution pattern by the vehicle front lighting apparatus.

In FIG. 6A, timings at which the LED 1 to the LED 12 determined according to the light distribution pattern are turned on and off are illustrated. In an example shown in FIG. 6A, in a light distribution pattern, the lighting duty ratio of the LED 1 and LED 2 is 30%, the lighting duty ratio of the LED 3 is 50%, the lighting duty ratio of the LED 4 is 60%, the lighting duty ratio of the LED 5 to the LED 8 is 80%, the lighting duty ratio of the LED 9 and the LED 10 is 60%, and the lighting duty ratio of the LED 11 to the LED 12 is 50%.

As described above with reference to FIG. 5, the LED 1 to the LED 12 are turned on sequentially at timings T1 to T12. Since the lighting duty ratio of the LED 1 is 30%, the LED 1 is turned off at a timing when a time corresponding to 30% of the lighting cycle elapses after the LED 1 has been turned on at the timing T1. Since the lighting duty ratio of the LED 2 is 30%, the LED 2 is turned off at a timing when a time corresponding to 30% of the lighting cycle has elapsed after the LED 2 has been turned on at the timing T2. Further, since the lighting duty ratio of the LED 3 is 50%, the LED 3 is turned off at a timing when a time corresponding to 50% of the lighting cycle has elapsed after the LED 3 has been turned on at the timing T3. Hereinafter, in the same manner, the LED 4 to the LED 12 are turned off at a timing when a time corresponding to each lighting duty ratio has elapsed after the LED 4 to the LED 12 have been turned on in order at the timing of T4 to T12. In this manner, the timing at which the LED 1 to the LED 12 are turned on and off can be determined in accordance with the light distribution pattern.

In the present specification, timings at which to turn on and off the LED 1 to the LED 12 determined according to the light distribution pattern are referred to as "lighting schedule". Further, in the present embodiment, since the timing at which the LED 1 to the LED 12 are turned on is determined in advance, actually, the turn-off timing is determined exclusively. However, the timing at which the LED 1 to the LED 12 are turned on may also be changed as required.

After the lighting schedule of the LED 1 to the LED 12 has been determined as described above, the LED 1 to the LED 12 are turned on or off by setting the control terminals of the switch elements SW1 to SW12 to the low state or the high state in accordance with the lighting schedule.

Figure 6B:
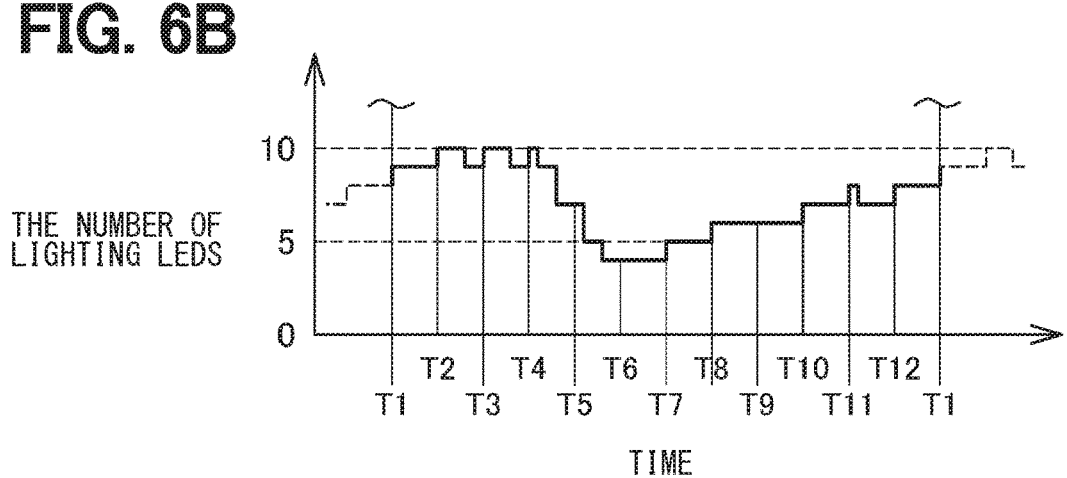
FIG. 6B is a diagram showing a state in which the number of lighting LEDs of the vehicle front lighting apparatus changes with the lapse of time.

When the lighting schedule of the LED 1 to the LED 12 is determined, the number of LEDs to be turned on (hereinafter, referred to as the number of lighting LEDs) changes with the lapse of time. FIG. 6B shows a state in which the number of lighting LEDs changes every moment with the lapse of time.

As described above with reference to FIGS. 3A and 3B, the resistance value of the path through which the current flows is proportional to the number of lighting LEDs. Therefore, when the voltage value of the voltage value control unit 24 is controlled so that the current value detected by the current value detection unit 23 reaches a predetermined target current value while turning on or off the LED 1 to the LED 12 according to the lighting schedule shown in FIG. 6A, the voltage value becomes a voltage value that changes in proportion to the number of lighting LEDs.

Upon receiving the light distribution pattern from the lamp ECU 50, the vehicle front lighting apparatus 100 according to the present embodiment sets the control terminals of the switch elements SW1 to SW12 to the low state or the high state in accordance with the lighting schedule determined as described above. With the above operation, the front of the vehicle 1 can be illuminated with the light distribution pattern designated by the lamp ECU 50.

The LED 1 to the LED 12 of the LED array 10 and the switch elements SW1 to SW12 of the control module 20 are connected to each other by the multiple bypass wirings 21a to 21m. When a disconnection occurs in any of the bypass wirings 21a to 21m, the front side cannot be illuminated with the light distribution pattern designated by the lamp ECU 50, and therefore, if the disconnection occurs, there is a need to be able to detect the disconnection quickly.

On the other hand, as described above, the number of LEDs mounted on the LED array 10 tends to increase year by year, and as the number of LEDs increases, the number of bypass wirings also increases, so that detection of disconnection becomes difficult year by year. Therefore, the vehicle front lighting apparatus 100 according to the present embodiment employs the following method in order to be able to quickly and easily detect the disconnection in the bypass wiring even if the number of LEDs mounted on the LED array 10 increases.

Figure 7A:
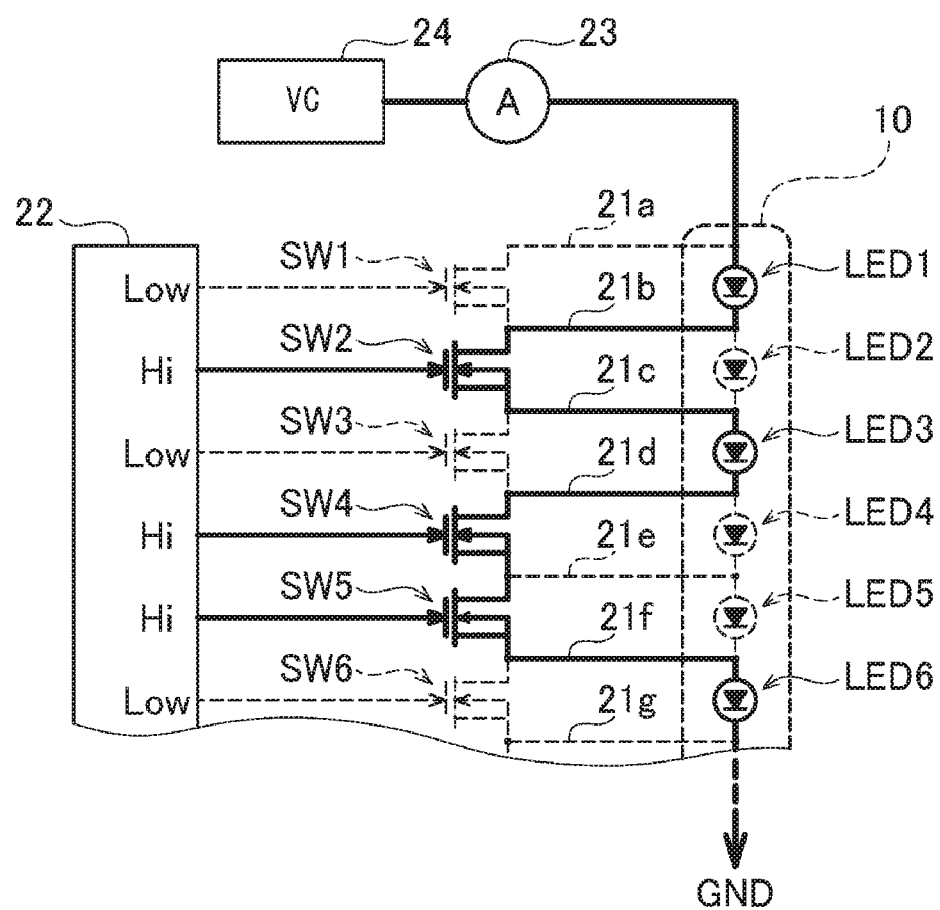
FIG. 7A is an illustrative diagram showing a condition in which no disconnection occurs in the bypass wiring.
Figure 7B:
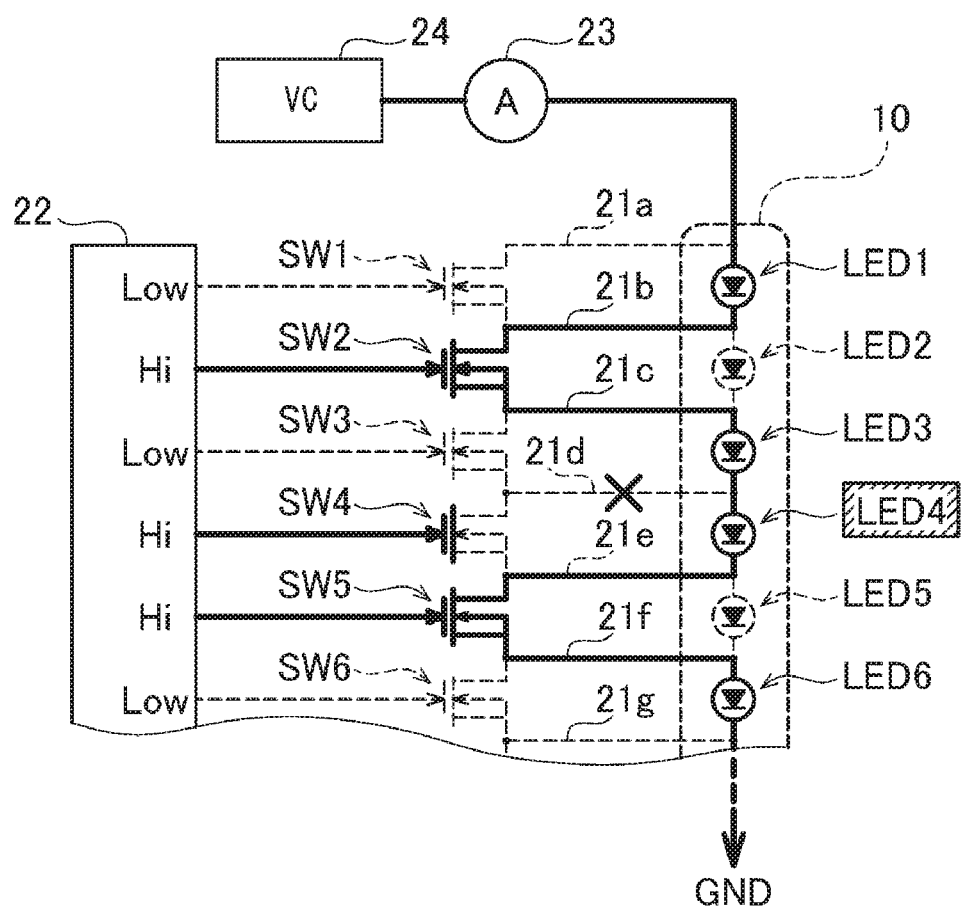
FIG. 7B is an illustrative diagram showing an exemplary effect of the disconnection of the bypass wiring on the operation of lighting the multiple LEDs of the LED array.

FIGS. 7A and 7B exemplify a state in which a path through which a current flows changes due to occurrence of a disconnection in the bypass wiring. As described above, the 12 LEDs of the LED 1 to the LED 12 are connected to the LED array 10 according to the present embodiment, but in order to avoid complication of illustration, the LED 7 to the LED 12 is not illustrated in FIGS. 7A and 7B as in FIGS. 3A and 3B. Correspondingly, in the description in FIGS. 7A and 7B as well, it is assumed that six LEDs of the LED 1 to the LED 6 are connected in series in the LED array 10, and six switches of the element SW1 to the switch element SW6 are provided.

FIG. 7A shows a condition in which disconnection does not occur. As shown in FIG. 7A, when the control terminals of the switch elements SW1, SW3, and SW6 are set to a low state and the control terminals of the switch elements SW2, SW4, and SW5 are set to a high state, a current flows through a path indicated by a thick solid line in the drawing. As a result, the LED 1, the LED 3, and the LED 6 is turned on and the LED 2, the LED 4, and the LED 5 are turned off.

In this situation, it is assumed that a disconnection occurs in the bypass wiring 21d. As shown in FIG. 7A, since the bypass wiring 21d is a path for allowing the current flowing through the LED 4 to bypass the LED 4, if the bypass wiring 21d is disconnected, the current cannot bypass the LED 4. As a result, even though the control terminal of the switch element SW4 is in the high state and the switch element SW4 is in the conductive state, a current flows through the LED 4 and the LED 4 is turned on.

A thick solid line shown in FIG. 7B represents a path through which a current flows at this time. In addition, a mark X in the drawing indicates that a disconnection occurs in the bypass wiring 21d. Further, the LED 4 surrounded in the drawing indicates that the LED 4 is actually turned on although the LED 4 is to be turned off naturally in response to the switch element SW4 being conductive.

In FIG. 7B, a case in which the disconnected bypass wiring 21d is a part of the path for bypassing the LED 4 will be described. When the bypass wiring 21d which allows the current to bypass the LED 4 is disconnected, the current cannot bypass the LED 4 and flows through the LED 4, as a result of which the LED 4 is turned on.

The same applies when the disconnected bypass wiring 21d is a part of the path for bypassing the LED 3.

Figure 8A:
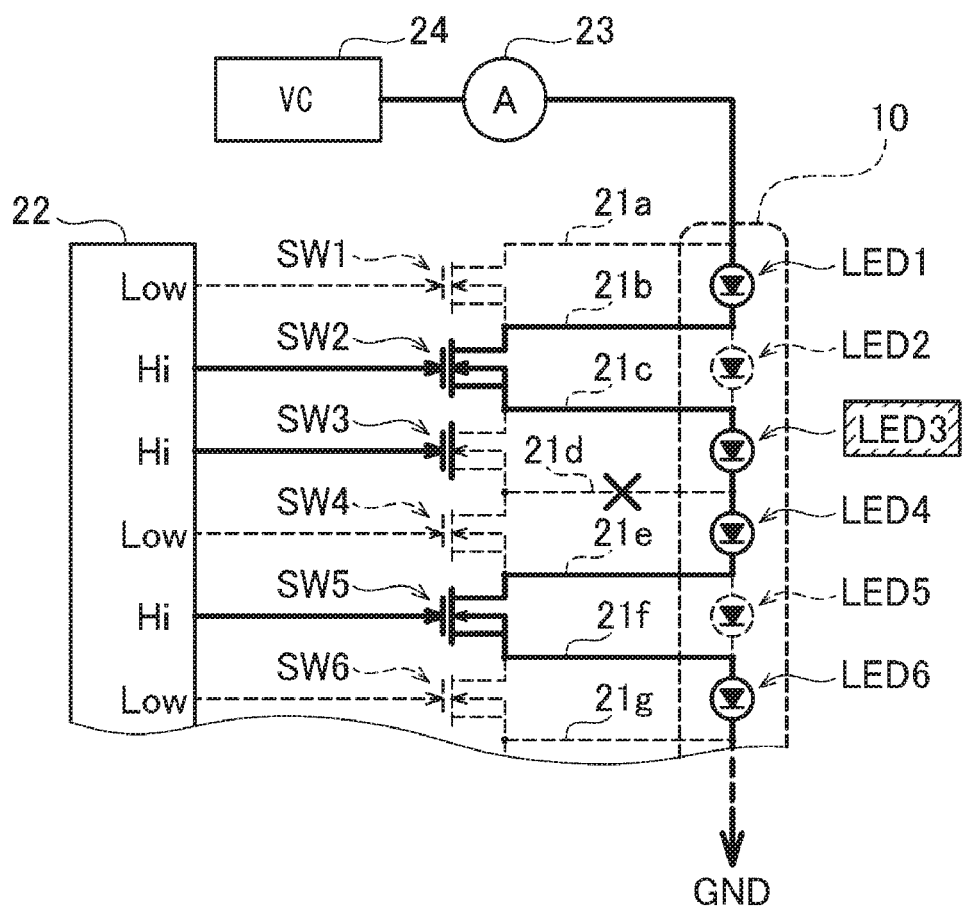
FIG. 8A is an illustrative diagram showing another exemplary effect of the disconnection of the bypass wiring on the operation of lighting the multiple LEDs of the LED array.

FIG. 8A shows a case in which the switch element SW3 on an upstream side of the disconnected bypass wiring 21d is in a conductive state (that is, the control terminal is in a high state), and the switch element SW4 on a downstream side is in a disconnected state (that is, the control terminal is in a low state). Since the switch element SW3 is in the conductive state, the current bypasses the LED 3 originally, but the current cannot bypass the LED 3 because the bypass wiring 21d, which is a part of the bypass path, is disconnected. As a result, a current flows through a path indicated by a thick solid line in FIG. 8A, and the LED 3 is turned on. In FIG. 8A, the LED 3 surrounded in FIG. 8A indicates that the LED 3 is actually turned on even though the LED 3 is to be turned off naturally in response to the switch element SW3 being conductive.

Figure 8B:
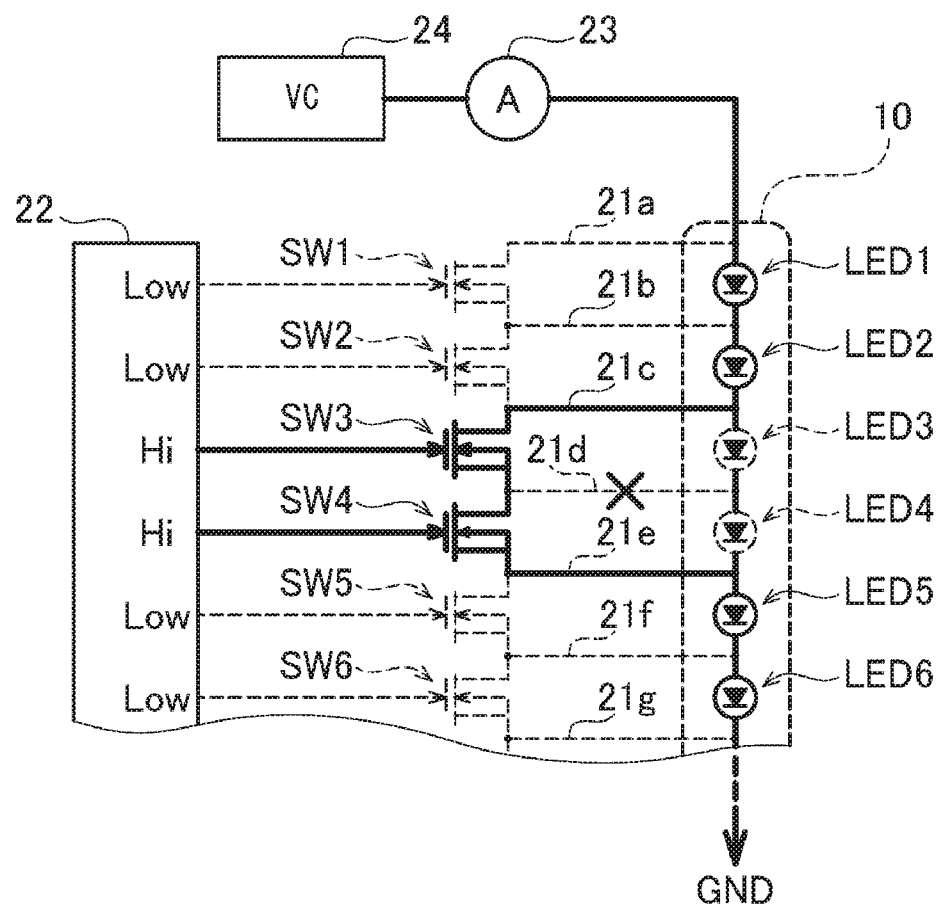
FIG. 8B is an illustrative diagram showing another exemplary effect of the disconnection of the bypass wiring on the operation of lighting the multiple LEDs of the LED array.

On the other hand, FIG. 8B shows a situation in which both the switch element SW3 on the upstream side and the switch element SW4 on the downstream side of the disconnected bypass wiring 21d become conductive. Since the switch element SW3 and the switch element SW4 are conductive, the current bypasses the LED 3 and the LED 4. For that reason, since the bypass wiring 21d drawn from between the LED 3 and the LED 4 does not form a part of a path through which the current bypasses the LED 3 and the LED 4, even if a disconnection occurs in the bypass wiring 21d, the LED 3 and the LED 4 remain turned off.

Contrary to the case shown in FIG. 8B, when both the switch element SW3 on the upstream side and the switch element SW4 on the downstream side of the disconnected bypass wiring 21d are disconnected, the current does not bypass the LED 3 and the LED 4 in the first place. For that reason, since the bypass wiring 21*d* does not form a part of the bypass path of the current, even if a disconnection occurs in the bypass wiring 21*d*, the LED 3 and the LED 4 remain turned on.

As is obvious from the above description, when a disconnection occurs in a certain bypass wiring, even if one of the LED on the upstream side and the LED on the downstream side of the bypass wiring is turned on and the other is turned off, both of the LEDs are turned on. When both LEDs are to be turned on or off, both LEDs can be turned on or off as intended.

Therefore, even if it is attempted to turn on and off the LED 1 to the LED 12 according to a predetermined lighting schedule, the number of LEDs actually turned on (hereinafter, referred to as the number of actual lighting LEDs) is larger than the number of lighting LEDs determined according to the lighting schedule if there is a disconnected bypass wiring.

Figure 9A:
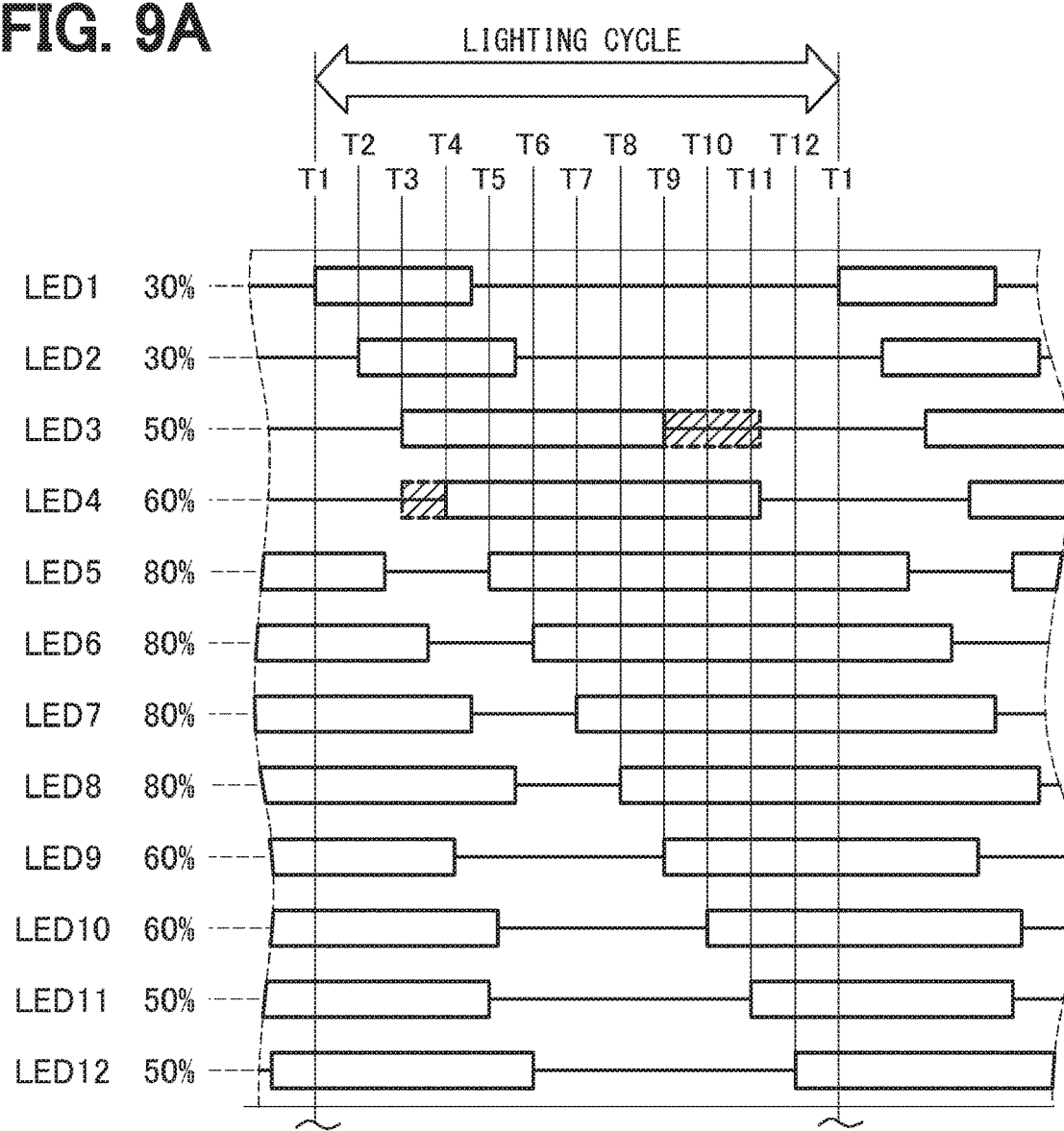
FIG. 9A is an illustrative diagram of a principle for detecting the presence or absence of a disconnection in a bypass wiring in the vehicle front lighting apparatus.

FIG. 9A illustrates an example in which the LED 1 to the LED 12 is turned on and off according to the lighting schedule shown in FIG. 6A while the bypass wiring 21*d* led out from between the LED 3 and the LED 4 is disconnected. Hatched portions in FIG. 9A indicate that the LEDs are turned on unintentionally because the bypass wiring 21*d* is disconnected. For example, the LED 4 is turned on together with the LED 3 because the LED 3 is turned on despite not yet a timing when the LED 4 is turned on. In addition, the LED 3 remains turned on because the LED 4 still remains turned on despite a timing at which the LED 3 is to be turned off.

As a result, the number of actual lighting that the LEDs are actually turned on is larger than the number of lighting LEDs that the LEDs attempt to be turned on according to the lighting schedule. Shaded portions in FIG. 9B indicates the number of lighting LEDs increased due to disconnection. As described above with reference to FIGS. 3A and 3B, since the voltage value control unit 24 controls the voltage value to be applied to the LED array 10 so that the value of current flowing through the LEDs becomes the target current value, the voltage value to be applied by the voltage value control unit 24 is proportional to the number of LEDs to be actually turned on (that is, the number of actual lighting LEDs).

Therefore, if the voltage value applied to the LED array 10 by the voltage value control unit 24 increases or decreases in accordance with a variation in the number of lighting LEDs, which is determined according to the lighting schedule, the disconnection does not occur, but if the variation in the number of lighting LEDs and the increase or decrease of the voltage value do not match each other (for example, if the increase or decrease of the voltage value increases or increases with respect to the variation in the number of lighting LEDs), it can be determined that the disconnection has occurred.

On the basis of the principle described above, the vehicle front lighting apparatus 100 according to the present embodiment detects the presence or absence of disconnection in the bypass wirings 21*a* to 21*m* connecting the LED array 10 and the control module 20.

Figure 10:
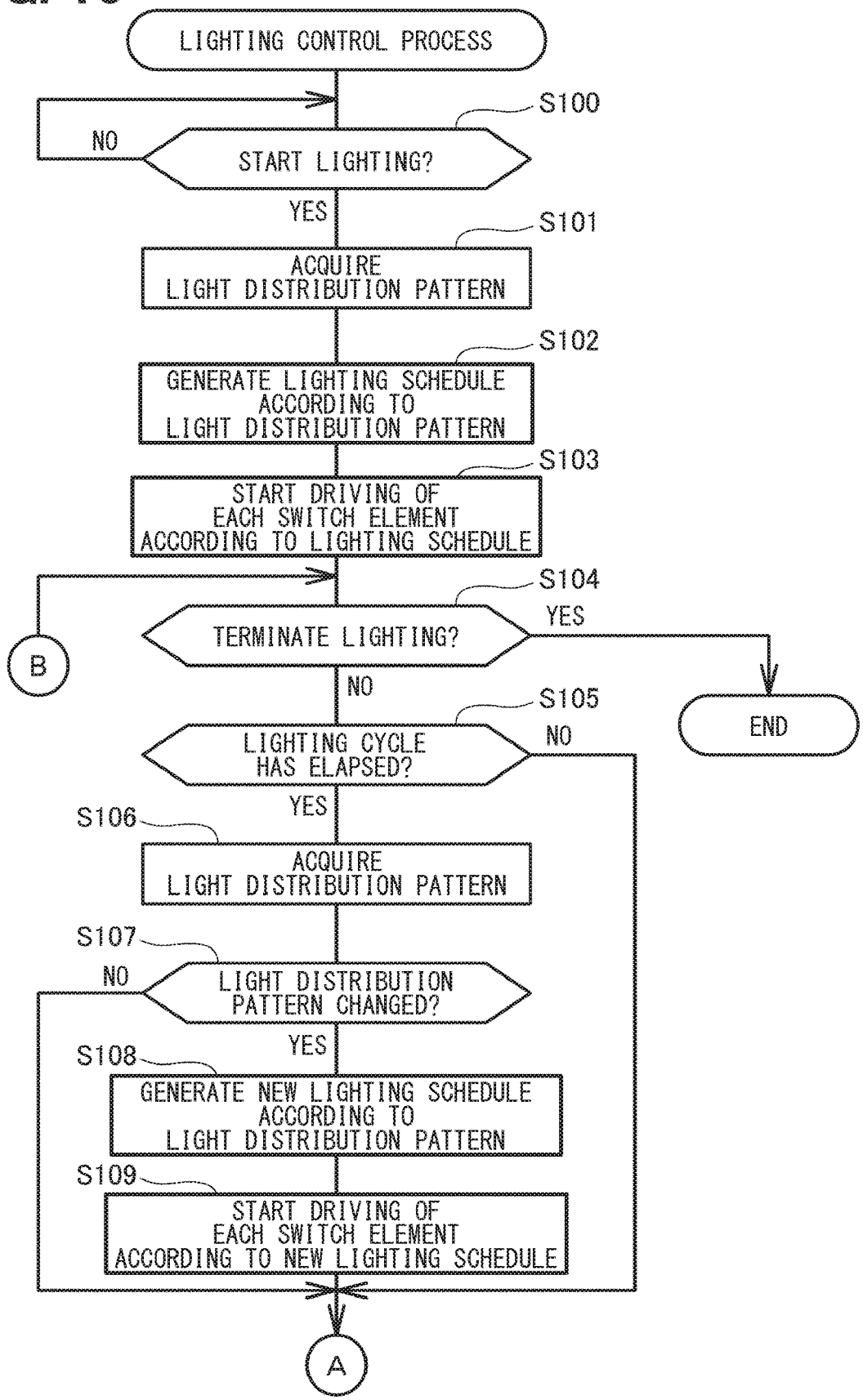
FIG. 10 is a flowchart showing a first half of a lighting control process to be executed by the vehicle front lighting apparatus.
Figure 11:
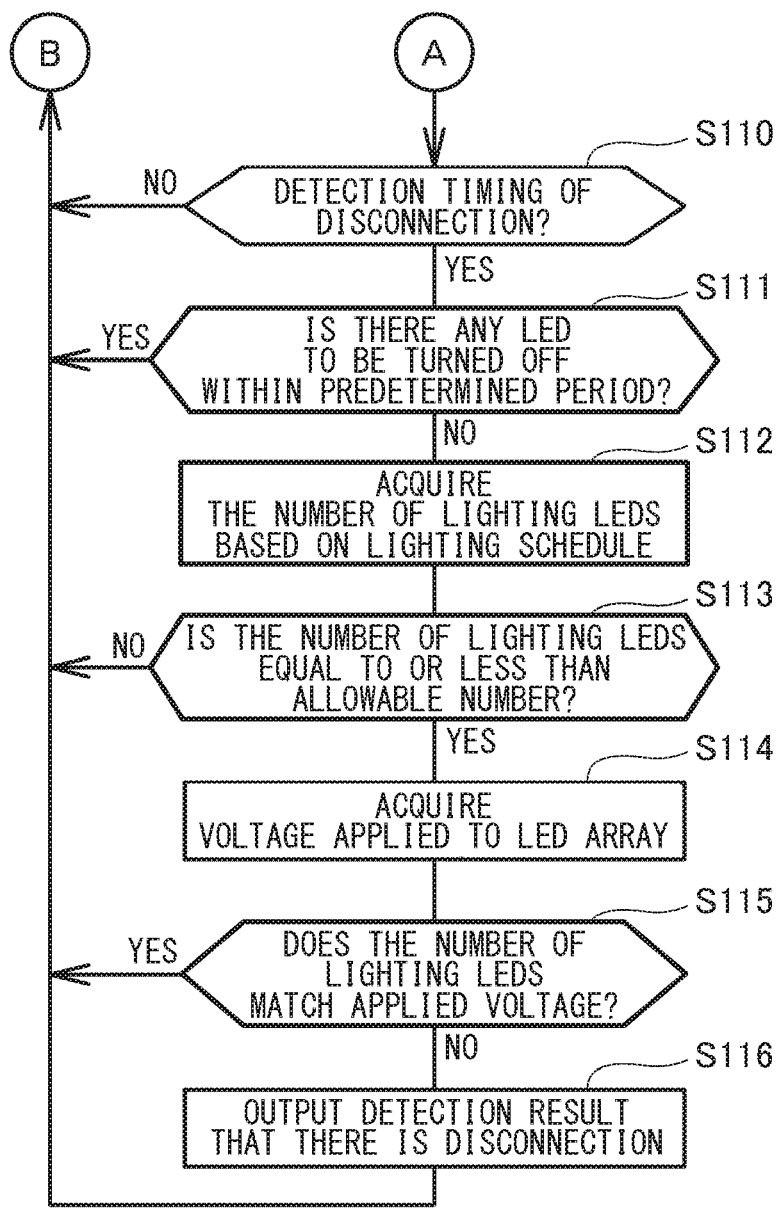
FIG. 11 is a flowchart showing a second half of the lighting control process to be executed by the vehicle front lighting apparatus.

FIGS. 10 and 11 show flowcharts of a lighting control process to be executed by the vehicle front lighting apparatus 100 according to the present embodiment to illuminate a region in front of the vehicle 1 by use of the LED array 10.

As shown in the figure, when the lighting control process is started, first, it is determined whether to start lighting by use of the LED array 10 (S100). In the present embodiment, the lamp ECU 50 determines whether the lighting is required based on the information acquired from the in-vehicle LAN 30, and outputs the result to the vehicle front lighting apparatus 100. Therefore, when an instruction to start lighting is not received from the lamp ECU 50, it is determined that lighting is not to be started (NO in S100), and the lighting control process is in a waiting state while repeating the same determination until the instruction to start lighting is received.

When an instruction to start lighting is received, it is determined to start lighting (YES in S100), and the light distribution pattern are acquired from the lamp ECU 50 (S101). As described above, the light distribution pattern is information indicating the luminance at which the plurality of LEDs of the LED array 10 are turned on.

Next, a lighting schedule corresponding to the light distribution pattern is generated (S102). As described above, the lighting schedule is data indicating a schedule of timings at which the multiple LEDs forming the LED array 10 are turned on and turned off. As exemplified in FIG. 6A, when the light distribution pattern is a pattern in which a lighting duty ratio of the LED 1 and the LED 2 is 30%, the lighting duty ratio of the LED 3 is 50%, the lighting duty ratio of the LED 4 is 60%, the lighting duty ratio of the LED 5 to the LED 8 is 80%, the lighting duty ratio of the LED 9 and the LED 10 is 60%, and the lighting duty ratio of the LED 11 to the LED 12 is 50%, the lighting schedule as shown in FIG. 6A is generated.

Then, according to the generated lighting schedule, driving of the switch elements SWs corresponding to the respective LEDs is started (S103). In other words, in accordance with the lighting schedule, the operation of setting the control terminal of the switch element SW of the LED to be turned on to the low state, and setting the control terminal of the switch element SW of the LED to be turned off to the high state is repeated in the lighting cycle of the LED.

Next, it is determined whether an instruction is given from the lamp ECU 50 to terminate the lighting (S104), and when no instruction is given from the lamp ECU 50 to terminate the lighting, it is determined that the lighting is not terminated (NO in S104), and it is then determined whether the lighting cycle has elapsed (S105).

When the lighting cycle has not yet elapsed since the driving of the switch elements SW is started, "NO" is determined in S105, and it is determined whether the present timing is a disconnection detection timing DT (S110 in FIG. 11). The detection timing DT is set to a timing at which a predetermined interval period IT has elapsed from a timing at which each of the LEDs of the LED array 10 is turned on. In other words, as described above with reference to FIGS. 6A and 6B, when the LED array 10 includes the LED 1 to the LED 12, the LED 1 to the LED 12 are sequentially turned on at the timings T1 to T12. Twelve timings at which a predetermined interval period IT has elapsed from each of the timings T1 to T12 become the disconnection detection timing DT.

The reason why the disconnection detection timing DT is set to such a timing is as follows.

Figure 12A:
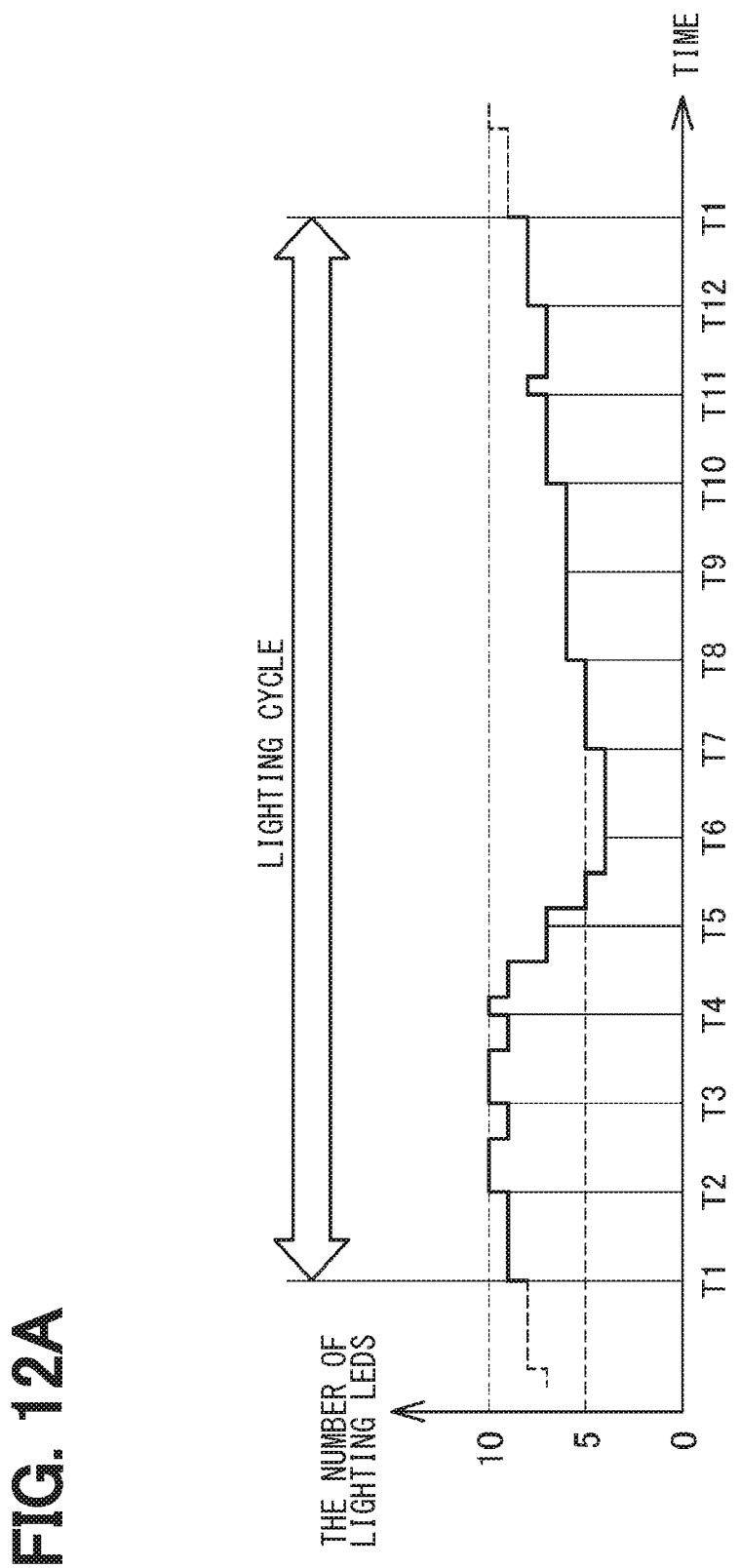
FIG. 12A is an illustrative diagram of a detection timing DT for detecting the presence or absence of a disconnection during the lighting control process.

FIG. 12A illustrates a state in which the number of lighting LEDs changes with the lapse of time when the LED 1 to the LED 12 of the LED array 10 are turned on according to the lighting schedule. As described above, a voltage to be applied to the LED array 10 by the voltage value control unit 24 increases or decreases in proportion to the number of LEDs to be turned on.

In this example, since the voltage value control unit 24 controls the voltage value so that the current value detected by the current value detection unit 23 reaches the target current value, a time delay occurs in the change of the voltage value even if the number of lighting LEDs is switched to another.

Figure 12B:
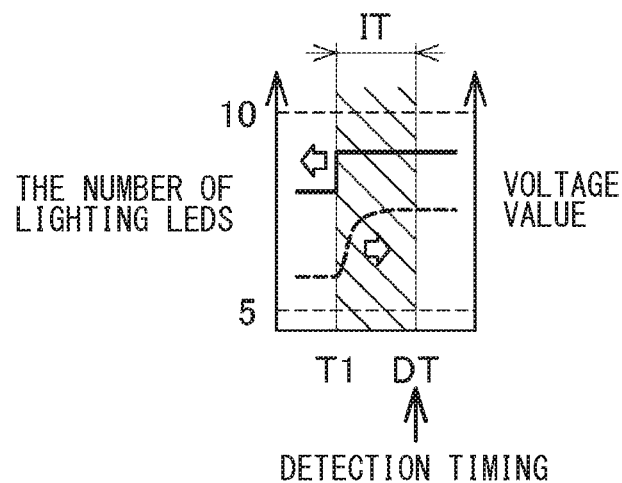
FIG. 12B is an enlarged view showing a change in the number of lighting LEDs before and after a timing T1 in FIG. 12A and a change in a voltage value to be applied.

FIG. 12B shows an enlarged view of a change in the number of lighting LEDs and a change in the voltage value to be applied before and after the timing of T1. As shown in the figure, since a voltage value indicated by a dashed line in the figure changes continuously differently from the number of lighting LEDs indicated by a solid line, a certain amount of time is required before the voltage value stabilizes. Therefore, a time required for the voltage value to stabilize with a margin (that is, an interval period IT), is determined in advance, and a timing at which the interval period IT has elapsed from the timings T1 to T12 at which the LED 1 to the LED 12 are turned on is set as a disconnection detection timing DT. With the above setting, erroneous determination of the disconnection due to detection of a voltage value before stabilization can be avoided.

When the interval period IT has not elapsed from the timings T1 to T12 at which the LED 1 to the LED 12 are turned on, it is determined that the timing is not the disconnection detection timing (NO in S110 of FIG. 11), and the flow returns to S104 in FIG. 10 where it is determined whether the lighting is to be terminated. As a result, when the lighting is not finished (NO in S104), it is determined whether the lighting cycle has elapsed (S105), and when the lighting cycle has not elapsed (NO in S105), it is again determined whether the timing comes to the disconnection detection timing (S110 in FIG. 11).

Even while the above operation is repeated, the driving of the switch elements SWs started in S103 in FIG. 10 is continued according to the lighting schedule.

As a result, since it is determined that the present timing comes to the disconnection detection timing DT (YES in S110 in FIG. 11), it is then determined whether there is any LED which is to be turned off within a predetermined period (S111). In this example, the predetermined period is set to a time obtained by adding a predetermined margin time dT (a time shorter than the interval period IT) to the interval period IT.

Figure 12C:
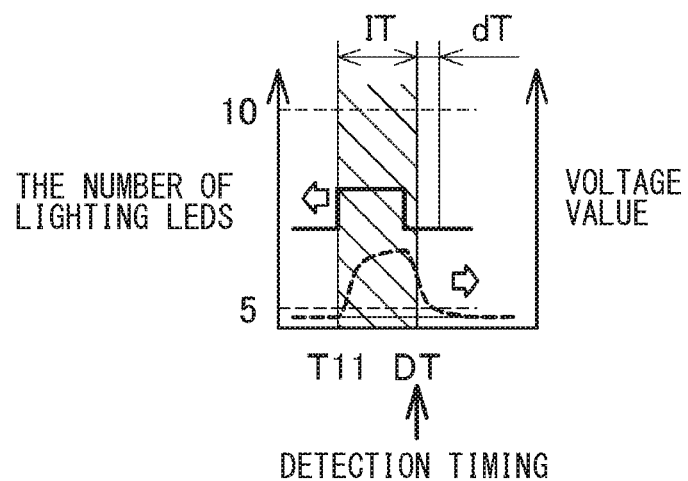
FIG. 12C is an enlarged view showing a change in the number of lighting LEDs before and after a timing T11 in FIG. 12A and a change in the voltage value to be applied.

Then, if there is no LED to be turned off within the predetermined period (NO in S111), the following operation is started to detect whether there is a disconnection, but if there is an LED to be turned off within the predetermined period (YES in S111), it is determined whether to terminate lighting without detecting disconnection (S104 in FIG. 10). The reason is as follows:

FIG. 12C shows an enlarged view of a change in the number of lighting LEDs and a change in the voltage value to be applied before and after the timing of T11. As described above with reference to FIGS. 6A and 6B, since the timing of T11 is the timing at which the LED 11 is turned on, the number of lighting LEDs is incremented by one, as a result of which a voltage value to be applied is increased as indicated by a dashed line in FIG. 12C. However, before the voltage value is stabilized (that is, before the detection timing DT comes), the other LEDs are turned off and the number of lighting LEDs is decremented by one. As a result, the increased voltage value changes to decrease.

Therefore, when there is an LED which is turned off during the period from the lighting timing (T11 in this example) to the elapse of the interval period IT, if the voltage value is detected at the disconnection detection timing DT, the voltage value during the decrease is detected, so that a correct voltage value cannot be detected.

It is also assumed that there is an LED which turns off just at the detection timing DT. Considering that it takes some time to detect the voltage value, in this case, the voltage value starts decreasing while the voltage value is being detected, and the correct voltage value cannot be detected. Therefore, if there is an LED which is turned off during a period from the detection timing DT until the elapse of a margin time dT with the time required for detecting the voltage value as the margin time dT, there is a possibility that the correct voltage value cannot be detected.

Therefore, in S111 of FIG. 11, it is determined whether there is any LED which is to be turned off within a predetermined period from any of the lighting timings T1 to T12 until the interval period IT and the margin time dT elapse. Then, if there is an LED to be turned off (YES in S111), it is determined that there is a possibility that a correct voltage value cannot be detected, and the flow returns to S104 in FIG. 10 without detecting whether there is a disconnection, and it is determined whether the lighting is to be terminated.

In addition, since the LED 1 to the LED 12 are turned on and off in accordance with a lighting schedule generated in accordance with the light distribution pattern (see FIGS. 6A and 6B), it can be easily determined whether there are an LED which is turned off within a predetermined period with reference to the lighting schedule.

Since the margin time dT described above is actually sufficiently shorter than the interval period IT, the margin time dT may be simply ignored. In this instance, in S111 of FIG. 11, it is determined whether there is an LED to be turned off during a period from any one of the lighting timings T1 to T12 until the interval period IT elapses (that is, until the disconnection detection timing DT comes).

As a result, when there is no LED to be turned off within the predetermined period (NO in S111), the number of LEDs to be turned on (that is, the number of LEDs to be turned on) is acquired (S112). The number of lighting LEDs can be obtained based on the lighting schedule.

Figure 9B:
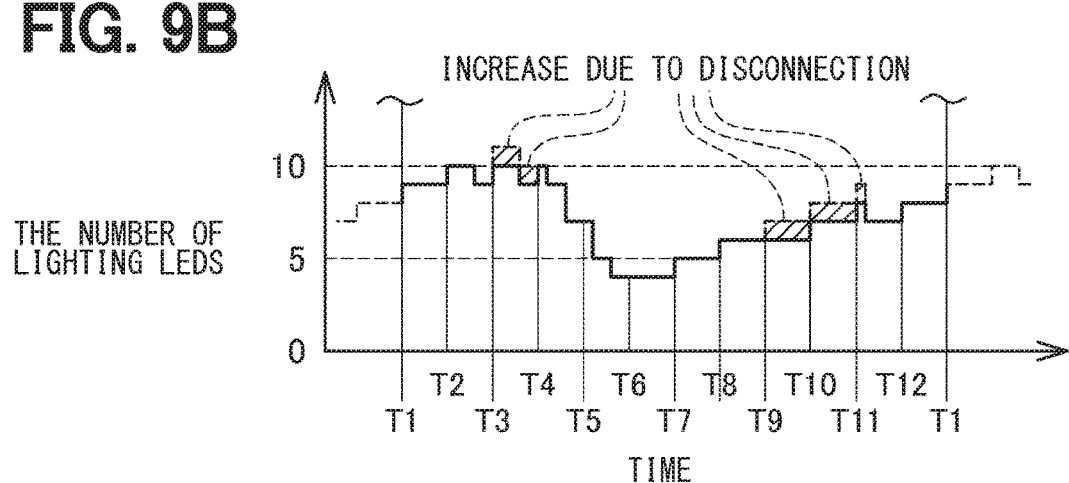
FIG. 9B is an illustrative diagram of a principle for detecting the presence or absence of the disconnection in the bypass wiring in the vehicle front lighting apparatus.

If a disconnection does not occur, the number of lighting LEDs obtained in this way matches the number of LEDs actually turned on (that is, the number of actual lighting LEDs), but if a disconnection occurs, the number of actual lighting LEDs becomes larger than the number of lighting LEDs obtained on the basis of the lighting schedule (see FIGS. 9A and 9B). Since the voltage value applied to the LED array 10 by the voltage value control unit 24 is determined according to the number of actual lighting LEDs, it can be determined whether there is a disconnection by determining whether the voltage value applied to the LED array 10 matches the number of lighting LEDs obtained by the lighting schedule.

However, in the present embodiment, prior to determining whether there is a disconnection, it is determined whether the number of lighting LEDs obtained by the lighting schedule is smaller than a predetermined allowable number (S113). When the number of lighting LEDs is larger than the allowable number (NO in S113), it is again determined whether to terminate the lighting without determining whether there is a disconnection (S104 in FIG. 10). The reason is as follows:

As described above with reference to FIGS. 9A and 9B, in the vehicle front lighting apparatus 100 according to the present embodiment, when a disconnection occurs in any of the bypass wirings 21*a* to 21*m*, the LEDs that are not intended to be turned on are turned on, so that the number of actual lighting LEDs is larger than the number of lighting LEDs based on the lighting schedule. As a result, a resistance value of the LED array 10 increases, and the voltage value applied by the voltage value control unit 24 also increases.

In this example, the resistance values of the individual LEDs vary. Therefore, if N number of lighting LEDs happen to be LEDs having a larger resistance value, the resistance value becomes equivalent to (N+1) number of LEDs, and it may be erroneously determined that a disconnection occurs. On the contrary, since (N+1) number of LEDs which are turned on due to disconnection happen to be LEDs having a smaller resistance value, a resistance value corresponding to N number of LEDs is obtained, and it may be erroneously determined that a disconnection does not occur. The possibility of such erroneous determination increases as the number of lighting LEDs increases.

Therefore, in the present embodiment, an appropriate allowable number is determined in advance in accordance with a variation in the resistance value of the LEDs, and when the number of lighting LEDs, which is determined according to the lighting schedule, is larger than the allowable number (NO in S113), it is not determined whether there is a disconnection in order to avoid erroneous detection. The allowable number of the present embodiment is set to 9.

On the other hand, when the number of lighting LEDs obtained on the basis of the lighting schedule is equal to or less than the allowable number (YES in S113), the voltage value applied to the LED array 10 is obtained (S114).

Then, it is determined whether the number of lighting LEDs obtained on the basis of the lighting schedule match the acquired voltage value (S115). In other words, if the number of lighting LEDs is N, the average resistance value of the LEDs is R, a variation of the resistance value is dR, and a target current value flowing through the LEDs is I, a current value V applied to the LED array 10 should fall within the following Expression.

$$N \cdot (R-dR) \cdot I < V < N \cdot (R+dR) \cdot I \quad (1)$$

Therefore, when the voltage value acquired in S114 falls within a range satisfying Expression (1), it is determined that the number of lighting LEDs and the voltage value match each other (YES in S115), and when the voltage value does not fall within the range satisfying Expression (1), it is determined that the number of lighting LEDs and the voltage value do not match each other (NO in S115).

As described above with reference to FIGS. 9A and 9B, in the vehicle front lighting apparatus 100 according to the present embodiment, the number of LEDs to be turned on increases and does not decrease when a disconnection occurs in the bypass wirings 21a to 21m. Therefore, in S115, Expression (1) is replaced with the following expression.

$$V < N \cdot (R+dR) \cdot I \quad (2)$$

Then, it may be determined whether the number of lighting LEDs and the voltage value match each other. This makes it possible to make a determination more quickly than in the case of using Expression (1).

As a result, when it is determined that the number of lighting LEDs and the voltage value do not match each other (NO in S115), the detection result of "with a disconnection" is output to the outside (for example, the lamp ECU 50 in FIG. 1B) (S116), and then the flow returns to S104 in FIG. 10, and it is determined whether the lighting is terminated.

On the other hand, when it is determined that the number of lighting LEDs and the voltage value match each other (YES in S115), the flow returns to S104 in FIG. 10 as it is without outputting the detection result, and it is determined whether the lighting is to be terminated.

As described above, in the lighting control process according to the present embodiment, when the driving of the switch elements SWs is started (S103) according to the lighting schedule corresponding to the light distribution pattern, it is detected whether there is a disconnection by repeating the operations described above (S115 and S116 in FIG. 11).

When the lighting cycle has elapsed while repeating the above operation (YES in S105 of FIG. 10), the light distribution pattern is acquired from the lamp ECU 50 (S106).

Then, it is determined whether the newly acquired light distribution pattern has been changed from the previously acquired light distribution pattern (S107). As a result, when there is no change in the light distribution pattern (NO in S107), the above-described series of processes (S110 to S116 in FIG. 11) is repeated until the lighting cycle has elapsed and the determination of "YES" is made in S105.

On the other hand, when the newly acquired light distribution pattern is changed from the previously acquired light distribution pattern (YES in S107), a new lighting schedule corresponding to the new light distribution pattern is generated (S108). After the driving of the switch elements SW is started (S109) according to the new lighting schedule, the processes of S110 to S116 in FIG. 11 are repeated until the lighting is terminated (YES in S104) or the lighting cycle elapses (YES in S105).

When it is finally determined that the lighting is to be terminated (YES in S104 of FIG. 10), the lighting control process in FIGS. 10 and 11 is terminated.

As described above, the vehicle front lighting apparatus 100 according to the present embodiment can detect the occurrence of the disconnection quickly when the disconnection occurs in the bypass wirings 21a to 21m for controlling the lighting operation of the respective LEDs of the LED array 10 by performing the lighting control process described above.

Further, in detecting the disconnection, there is only a need to determine whether the number of LEDs to be lit in the LED array 10 matches the voltage value applied to the LED array 10, so that whether there is a disconnection can be detected easily and quickly.

It is needless to say, when there is an LED that turns off within the predetermined period (YES in S111 of FIG. 11), when the number of lighting LEDs to be turned on has exceeded the allowable number (NO in S113), it cannot be detected whether there is a disconnection, but the LEDs to be turned on change with the lapse of time (see FIG. 6B), and further vary depending on the light distribution pattern. Therefore, after a certain period of time has elapsed, it can be detected whether there is a disconnection.

There are several modifications of the above embodiment. Hereinafter, those modifications will be briefly described focusing on differences from the embodiment described above.

First Modification

In the above embodiment, the occurrence of the disconnection is detected, but a portion where the disconnection occurs is not detected. However, in S115 of FIG. 11, when it is determined that the number of lighting LEDs and the voltage value do not match each other (NO in S115), which of the LEDs is to be lighted may be detected to detect the portion where the disconnection has occurred.

For example, in an example shown in FIGS. 9A and 9B, mismatch is detected at four portions of the timing DT after the timing of T3, the detection timing DT after the timing of T9, the detection timing DT after the timing of T10, and the detection timing DT after the timing of T11.

In this example, at a first point (that is, the detecting timing DT after the timing T3), the LED 1 to the LED 3 and the LED 6 to the LED 12 are to be turned on. As described above with reference to FIGS. 7A to 8B, the LEDs that are not to be turned on are turned on when one of the upstream side and the downstream side of the disconnected bypass wiring is turned on and the other of the disconnected bypass wiring is turned off. Therefore, there is a possibility of disconnection at two portions of the bypass wiring 21d drawn from the downstream side of the LED 3 (see FIG. 2) and the bypass wiring 21f drawn from the upstream side of the LED 6 (see FIG. 2).

Further, at a second position (that is, the detecting timing DT after the timing T9), the LED 4 to the LED 9 are to be turned on, and therefore, there is a possibility of disconnection at two portions, that is, the bypass wiring 21d drawn from the upstream side of the LED 4 or the bypass wiring 21j (see FIG. 2) drawn from the downstream side of the LED 9.

Therefore, that the disconnected position is the bypass wiring 21d can be specified according to the information of the LEDs which are to be turned on at those two portions (that is, the detection timing DT after the timings of T3 and T9). Further, even if the disconnection occurs in multiple portions, if the method described above is applied to multiple portions determined as mismatch in the determination of S115 in FIG. 11, a position at which the disconnection occurs can be specified.

Figure 13:
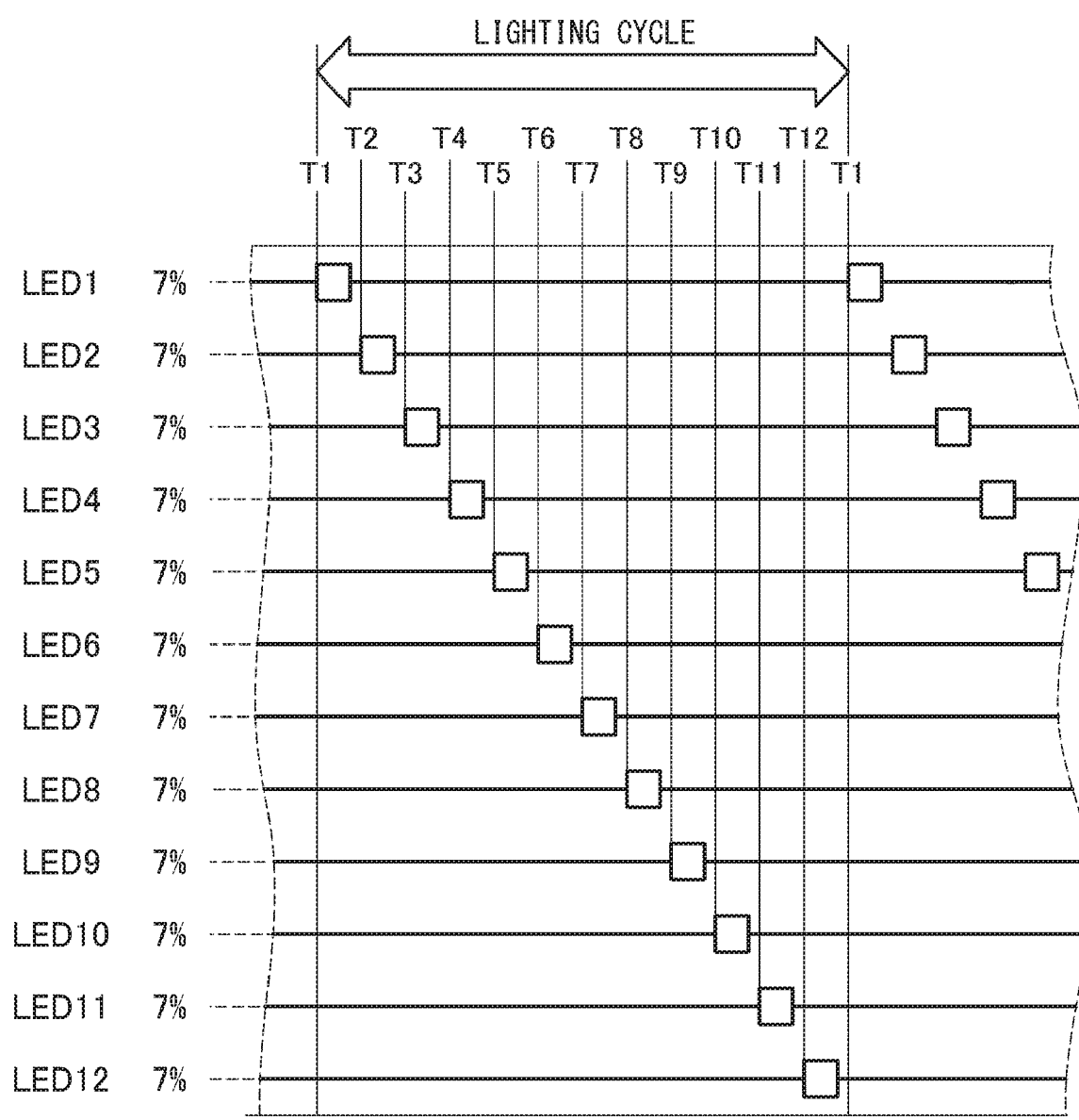
FIG. 13 is an illustrative diagram illustrating a lighting schedule used for detecting a disconnection position in a lighting control process according to a first modification.

Alternatively, in the lighting control process according to the present embodiment described above, after it is determined that lighting is to be started (YES in S100 of FIG. 10), the LED 1 to the LED 12 may be turned on in the lighting schedule for detecting the disconnection position as exemplified in FIG. 13 before the light distribution pattern is acquired from the lamp ECU 50 (S101).

In the lighting schedule for detecting the disconnection position illustrated in FIG. 13, the LED 1 to the LED 12 are turned on one by one. For that reason, when the number of lighting LEDs and the voltage value applied to the LED array 10 do not match each other, it can be immediately detected that the bypass wiring drawn from the downstream side of the LED to be turned on is disconnected. In addition, even in the case where the wiring is disconnected at multiple portions, those disconnected portions can be detected immediately.

Second Modification

In the above embodiment, it is not detected whether there is a disconnection when the number of LEDs to be turned on (that is, the number of lighting LEDs) exceeds the predetermined allowable number.

However, the multiple LEDs forming the LED array 10 (in the embodiment described above, the LED 1 to the LED 12) are divided into multiple groups so that the number of LEDs in each group may not exceed the allowable number.

Figure 14:
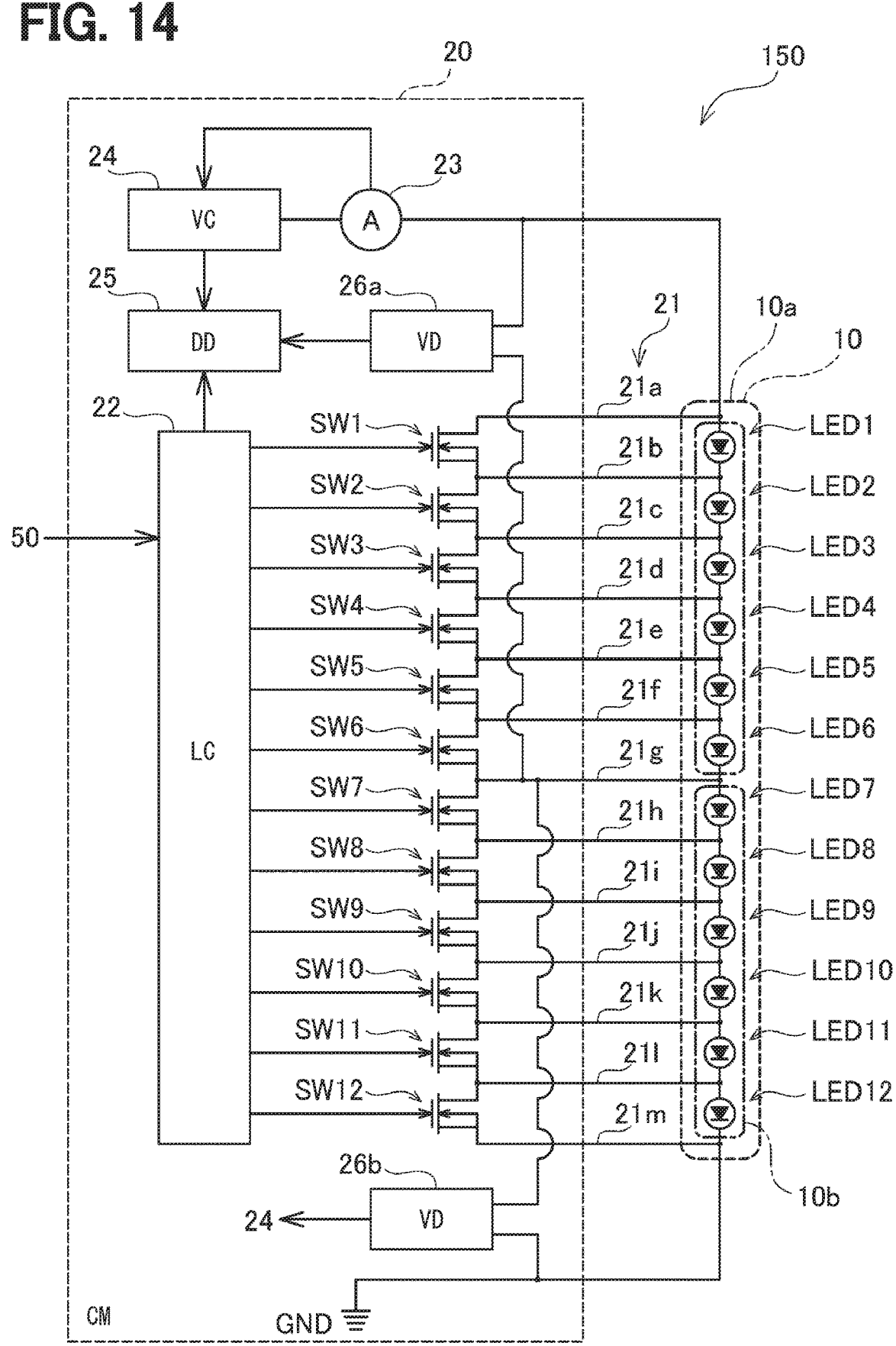
FIG. 14 is a block diagram showing an internal structure of a vehicle front lighting apparatus according to a second modification.

FIG. 14 shows an internal structure of a vehicle front lighting apparatus 150 according to a second modification in which the LEDs of the LED array 10 are divided into multiple groups. The vehicle front lighting apparatus 150 according to the second modification shown in FIG. 14 differs from the vehicle front lighting apparatus 100 according to the present embodiment shown in FIG. 2 in that a voltage detection unit (VD) 26a for detecting a voltage value applied to a group 10a up to the LED 1 to the LED 6 and a voltage detection unit (VD) 26b for detecting a voltage value applied to a group 10b up to the LED 7 to the LED 12 are provided. The voltage detection units 26a and 26b correspond to a "voltage detector" in the present disclosure.

In the vehicle front lighting apparatus 150 according to the second modification, similarly to the vehicle front lighting apparatus 100 according to the present embodiment described above, the LED 1 to the LED 12 are turned on or off by causing the lighting control unit 22 to turn the control terminals of the switch elements SW1 to SW12 to a low state or a high state. The voltage value control unit 24 controls the voltage value to be applied to the LED array 10 so that the current value detected by the current value detection unit 23 reaches a predetermined target current value.

In the vehicle front lighting apparatus 150 according to the second modification, a voltage detection unit 26a detects a voltage value applied to the LED 1 to LED 6 in the group 10a and outputs the detected voltage value to the disconnection determination unit 25. The voltage detection unit 26b detects a voltage value applied to the LED 7 to the LED 12 in the group 10b, and outputs the detected voltage value to the disconnection determination unit 25.

Then, the disconnection determination unit 25 determines whether the number of lighting LEDs on which the LEDs are to be turned on matches the applied voltage value for each of the groups 10a and 10b, and if the number of lighting LEDs and the voltage value do not match each other, it is determined that the disconnection has occurred in the bypass wiring of the groups 10a and 10b.

With the above configuration, since the number of LEDs in the groups 10a and 10b can be set to be equal to or less than the allowable number, even if the number of LEDs in the LED array 10 increases, it can be detected whether there is a disconnection.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle front lighting apparatus for illuminating a region in front of a vehicle by use of a plurality of lighting devices in a shared manner, the vehicle front lighting apparatus comprising:
   a lighting device array in which the lighting devices are connected in series;
   a plurality of bypass circuits provided for the lighting devices, respectively and allowing a current flowing through the lighting devices to bypass the lighting devices;
   a plurality of switch elements provided for the bypass circuits, respectively, for opening and closing the bypass circuits;
   a lighting controller configured to control a lighting mode of the lighting device array by bringing the switch elements corresponding to the lighting devices to be turned on into an opened state and bringing the switch elements corresponding to the lighting devices to be turned off into a closed state;
   a current value detector configured to detect a value of current flowing through the lighting device array;

a voltage value controller configured to apply a voltage to the lighting device array, and controlling a voltage value to be applied to cause a value of current flowing through the lighting device array to reach a predetermined target current value; and a disconnection determiner configured to determine whether the number of the switch elements brought into the opened state matches the voltage value that is controlled, and if not, to determine that there is a disconnection in any of the bypass circuits, wherein the lighting controller turns on and off the lighting devices in a predetermined cycle by opening and closing the switch elements in the predetermined cycle at phases mutually shifted among the switch elements, when receiving information about a target brightness to illuminate the region in front of the vehicle for each of the lighting devices, the lighting controller controls a time ratio of the opened state in the predetermined cycle of each of the switch elements corresponding to each of the lighting devices in accordance with the target brightness, and the disconnection determiner determines whether there is the disconnection in the bypass circuits by determining whether the number of the switch elements in the opened state that varies in the predetermined cycle matches the voltage value controlled by the voltage value controller in the predetermined cycle.

2. The vehicle front lighting apparatus according to claim 1, wherein the disconnection determiner performs a determination of whether there is the disconnection at a predetermined timing set in synchronization with the predetermined cycle, and stops the determination when there is the switch element that is switched to the closed state within a predetermined period among the switch elements.

3. The vehicle front lighting apparatus according to claim 1, wherein the disconnection determiner determines whether there is the disconnection when the number of the switch elements to be into the closed state is equal to or less than a predetermined allowable number.

4. The vehicle front lighting apparatus according to claim 1, further comprising a voltage detector configured to divide the lighting device array into a plurality of groups in which the lighting devices are connected in series, and detect a voltage value to be applied to each of the groups, wherein the disconnection determiner determines whether there is the disconnection for each of the groups.

* * * * *